United States Patent
Takai

[19]

[11] Patent Number: 5,978,412
[45] Date of Patent: Nov. 2, 1999

[54] SPREAD SPECTRUM COMMUNICATION SYSTEM

[75] Inventor: Kenichi Takai, Tokyo, Japan

[73] Assignee: NEC Corporation, Tokyo, Japan

[21] Appl. No.: 08/905,117

[22] Filed: Aug. 1, 1997

[30] Foreign Application Priority Data

Aug. 12, 1996 [JP] Japan .................................. 8-212548

[51] Int. Cl.$^6$ ........................... H04B 15/00; H04B 7/216
[52] U.S. Cl. .......................... 375/200; 375/206; 375/208; 370/342
[58] Field of Search .................................. 375/200, 206; 370/342, 335, 320, 202, 208

[56] References Cited

U.S. PATENT DOCUMENTS

| | | | |
|---|---|---|---|
| 5,103,459 | 4/1992 | Gilhousen et al. | 375/205 |
| 5,467,367 | 11/1995 | Izumi et al. | 375/206 |
| 5,546,424 | 8/1996 | Miyake | 375/206 |
| 5,572,514 | 11/1996 | Miyake | 370/248 |
| 5,604,732 | 2/1997 | Kim et al. | 370/342 |
| 5,677,929 | 10/1997 | Asano et al. | 375/206 |
| 5,703,873 | 12/1997 | Ojanpera et al. | 370/332 |
| 5,706,275 | 1/1998 | Zhengdi | 370/204 |
| 5,751,761 | 5/1998 | Gilhousen | 375/200 |
| 5,781,541 | 7/1998 | Schneider | 370/335 |
| 5,838,717 | 11/1998 | Ishii et al. | 375/201 |

FOREIGN PATENT DOCUMENTS

| | | |
|---|---|---|
| 63-127634 | 5/1988 | Japan . |
| 5-110538 | 4/1993 | Japan . |

*Primary Examiner*—Chi H. Pham
*Assistant Examiner*—Khai Tran
*Attorney, Agent, or Firm*—Foley & Lardner

[57] ABSTRACT

In a spread spectrum communication system, as base station transmission channels are used a synchronizing channel for continuously transmitting a predetermined PN code from a base station (generated by a synchronizing pilot channel generating block), a identifying channel for continuously transmitting a predetermined multivalued PN code every base station (generated by an identifying pilot channel generating block), and a communication channel for enabling the identification of a base station transmitting data by multiplying the multivalued PN code used in the identifying channel by communication data after spectrum spreading (generated by a communication channel generating block).

21 Claims, 21 Drawing Sheets

FIG. 4a
SYNCHRONIZING CODE
(COMMON TO ALL BASE STATIONS)

| 1011 | 1011 | 1011 | 1011 |

FIG. 4b
IDENTIFYING CODE
(BASE STATION α)
USING 16 PNs

| 0011 | 0000 | 1100 | 0111 | 0011 | 0000 | 1100 | 0111 | 0011 | 0000 |
| (3) | (0) | (C) | (7) | (3) | (0) | (C) | (7) | (3) | (0) |

FIG. 4c
IDENTIFYING CODE
(BASE STATION β)

| 0111 | 0011 | 0000 | 1100 | 0111 | 0011 | 0000 | 1100 | 0111 | 0011 |
| (7) | (3) | (0) | (C) | (7) | (3) | (0) | (C) | (7) | (3) |

* WHEN THE ABSOLUTE PHASE OF ONE MULTIVALUED PN SEQUENCE IS SHIFTED (EVERY HEXADECIMAL NUMBER) AND ALLOCATED TO EACH BASE STATION

FIG.5a
SYNCHRONIZING CODE
(COMMON TO ALL BASE STATIONS)

| 1011 | 1011 | 1011 | 1011 | 1011 |
|------|------|------|------|------|

FIG.5b
IDENTIFYING CODE
(BASE STATION ALPHA)
USING 16 PNs

| 0011 | 0000 | 1100 | 0111 | 0011 | 0000 | 1100 | 0111 | 0011 | 0000 |
|------|------|------|------|------|------|------|------|------|------|
| (3)  | (0)  | (C)  | (7)  | (3)  | (0)  | (C)  | (7)  | (3)  | (0)  |

FIG.5c
IDENTIFYING CODE
(BASE STATION BETA)
USING 16 PNs

| 1100 | 1111 | 0011 | 1000 | 1100 | 1111 | 0011 | 1000 | 1100 | 1111 |
|------|------|------|------|------|------|------|------|------|------|
| (C)  | (F)  | (3)  | (8)  | (C)  | (F)  | (3)  | (8)  | (C)  | (F)  |

\* WHEN DIFFERENT MULTIVALUED PN SEQUENCES ARE ALLOCATED TO RESPECTIVE BASE STATIONS

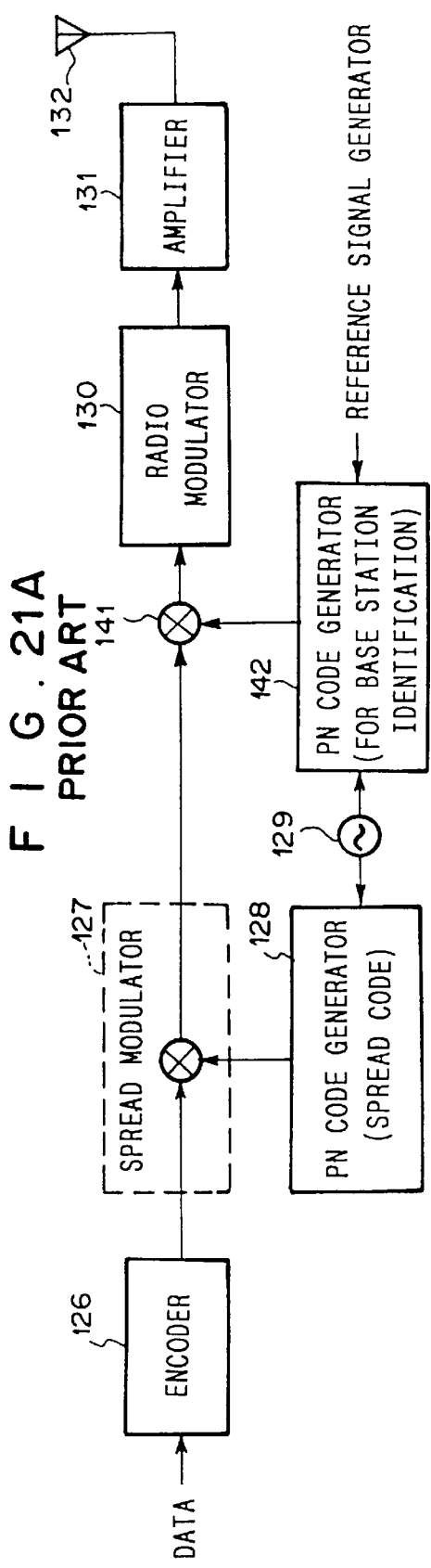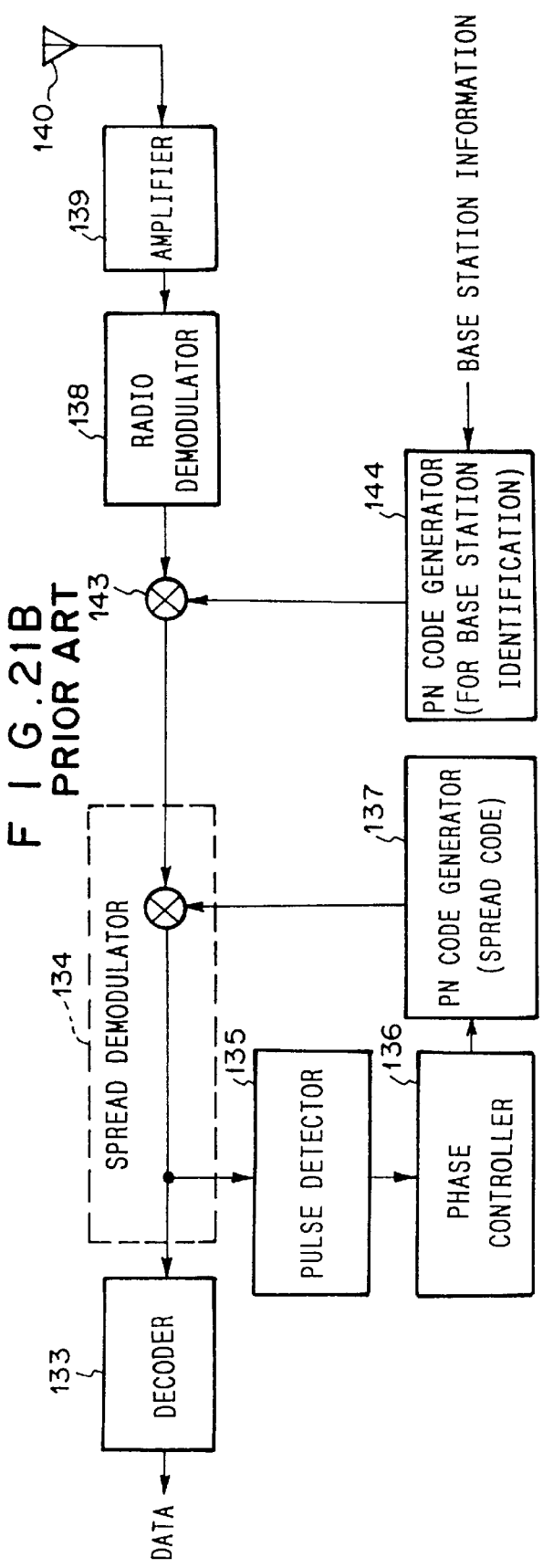

5,978,412

SPREAD SPECTRUM COMMUNICATION SYSTEM

BACKGROUND OF THE INVENTION

1. Field of the Invention

The present invention relates to a code division multiple access (CDMA) system including a spread spectrum communication system, and particularly to a code division multiple access system for increasing the speed of synchronous acquisition processing and also enhancing high secrecy.

2. Description of the Related Art

According to the spread spectrum communication system, a spread code (ordinarily, pseudo noise code (hereinafter referred to as "PN code")) is generally modulated by data at a transmission side to spread the frequency spectrum, and a received code and the PN code are subjected to correlation processing at a reception side. If both the codes of the transmission side and the reception side are coincident with each other or by synchronizing both the codes with the self-correlation wave of large amplitude appearing in the neighborhood of the codes, the data can be decoded without suffering the effect of multipass and narrow-band noise.

According to a direct spread spectrum communication system which is one type of spread spectrum communication system, the data are multiplied by a PN code having a chip rate which is remarkably higher than the data rate to spread the spectrum. In this system, a simultaneous multiplex communication in the same frequency band can be performed by discriminating different PN codes or PN codes which are different in absolute phase. This system is also called as CDMA (Code Division Multiple Access) system, and a number of studies have been made to enable practical use of this system to a radio-communication such as a mobile communication or a radio LAN.

FIG. 20A shows the construction of a general transmission portion of the CDMA system, and FIG. 20B shows the construction of a general receiving portion of the CDMA system.

At the transmission unit, the data are first input to an encoder 126. In the encoder 126, an error correction capability such as convolution encoding of the input data, etc. are added, and a secrecy function such as interleave, etc. are added. The data output from the encoder are input to a spread modulator 127, and multiplied by the PN code (whose chip rate is remarkably higher than the bit rate of the data) generated in a PN code generator 128 by a multiplier, whereby the data are subjected to spectrum spread processing.

The PN code generator 128 is driven by a reference clock from a reference signal generator 129. The spectrum-spread data are frequency-converted to an RF band in a radio modulator 130, amplified to a desired level in an amplifier 131 and then radiated from an antenna 132. The data may be subjected to phase modulation such as BPSK or the like in the radio modulator 130. At the reception unit, as shown in FIG. 20B, the signal received from an antenna 140 is amplified by an amplifier 139, down-converted to an IF band in a radio demodulator 138, and then input to a spread demodulator 134. The reception unit is provided with a PN code generator 137 for generating the same PN code as the PN code generator 128 at the transmission unit, and the PN code generated in the PN code generator 137 and the down-converted reception signal are multiplied by a multiplier. Here, when the PN code multiplied by the reception signal and the PN code generated in the PN code generator 137 are not synchronized with each other, the integration value (correlation value) of the multiplication result of both the PN codes exhibits an average noise level, however, when the synchronization therebetween is established, the correlation value has a peak.

Accordingly, a phase controller 136 controls the phase of the PN code of the PN code generator 137 so that the peak is detected (with [?] pulse detector 135) and the peak can be continuously detected. When the synchronization is established as described above, the despread of the reception signal succeeds, so that the reception signal of the base band from which the PN code is removed can be decoded. In a decoder 133, the scramble of the data is released by deinterleaving the data, error correction is applied by a viterbi decoding, and then the decoded reception data are picked up. In this process, a narrow-band noise and a multipass signal which are added in a transmission path between the transmission unit and the reception unit are subjected to spectrum spreading, and reduced to such a level that they have no effect on the reception of the desired wave.

When the spread spectrum communication system is applied to a mobile communication system (cellular system) for example, in many cases another PN code which is different from the spread code having the above basic construction is used in combination with the spread code. The basic system is constructed by plural personal stations for every master station. However, in the mobile communication system, each personal station (mobile station in the mobile communication) is required to identify a master (base) station to which the personal station communicates because there are plural base stations as a master station in the mobile communication system. Particularly in the mobile communication (cellular system), the communication is carried out while a mobile station moves between base stations each constituting an area which is called as a cell, and thus the identification of the base station is indispensable to support a technique inherent to the CDMA which is called as "soft hand-off" occurring in the neighborhood of the cell boundary.

Therefore, individual PN codes or PN codes which are different in absolute phase are allocated to the respective base stations in addition to the PN code for spreading the data, and then multiplied by the data after the spectrum spread processing as if the transmission data are provided with the color of each base station, whereby the mobile station can identify each base station serving as a transmission side of the reception data.

FIGS. 21A and 21B show the basic construction of a transmission unit of a base station and a reception unit of a mobile station which are used in the mobile communication system. In a multiplier 141, the data which is subjected to the spectrum spreading in the spread modulator 127 are multiplied by a base-station identifying PN code which is generated in another PN code generator 142, and then input to the radio modulator 130. The other operation is the same as shown in FIG. 20.

In the reception unit of the mobile station, the base-station identifying PN code which is the same as the transmission unit of the base station is generated in a PN code generator 144, and in the multiplier, the PN code thus generated is multiplied by the reception data which is down-converted in the radio demodulator 138. When the synchronization is established between the PN code of the transmission unit of the base station contained in the reception data and the base-station identifying PN code which is multiplied in the reception unit of the mobile station, the base station identifying PN code is removed from the reception data. The reception signal from which the base-station identifying PN code is removed is despread in the spread demodulator 134, and decoded in the decoder 133 to restore the data.

In the spread spectrum communication system, it is a key point of the data restoration whether the synchronization can be established with the spread code contained in the reception data at the reception side. In other words, this means the secrecy to an irregular receiver. Therefore, various studies have been made to enhance the secrecy and shorten the initial synchronizing time at the reception side on the spread spectrum communication system.

A technique as disclosed in Japanese Laid-open Patent Application No. Sho-63-127634 is one of the above studies. According to this study, in addition to a technique for "adding a synchronous signal to the head of a data frame" which has been hitherto considered, a PN code which is exclusively used for synchronization (i.e., synchronization-only PN code) and is synchronized with the spread code of data is transmitted from a master station completely independently of the data and also continuously, whereby a personal station is beforehand synchronized with the synchronization-only PN code to shorten the synchronous acquisition time with the spread code in the despread processing of the data.

FIGS. 14 and 15 show a conventional technique, and FIG. 16 shows an example of transmission data of a master station. Now, the operation when the data are transmitted from a master station to a personal station as shown in the figures by using the conventional technique will be described.

First, a PN code II generator 96 and an PN code I generator 97 generate different PN codes in synchronism with a clock of a clock generator 98. However, the relative phase of the two PN codes is predetermined. The PN code generated in the PN code II generator 96 is amplified in power by an amplifier 99, and transmitted at all times. The PN code generated in the PN code I generator 97 is modulated by a modulator 100 only when there is transmission data, and then amplified and transmitted by the amplifier 99.

Further, in the personal station, the received PN code II is correlated with the output of a PN code II generator 104 by a correlator 109, and only the PN code II for synchronization is selected and demodulated in a demodulator 110. A one-period search circuit 107 varies the oscillation frequency of an oscillator of the clock generator 105 to vary the phase of the PN code II. In this case, the search is performed over one period of the PN code II. Therefore, the time required for synchronous acquisition is long, however, once the synchronization is established, the synchronization will have been subsequently continuously established. A PN code I generator 106 operates in synchronism with the clock generator and the PN code II generator 104, and it is coincident with the relative phase which is determined in the master station. The PN code I output from the PN code I generator 106 is correlated with the reception signal by a correlator, however, in this case, the synchronization can be established in a short time by delaying the phase of the PN code I generator 106 by a chip search circuit 112.

Further, there is also known another conventional technique as disclosed in Japanese Laid-open Patent Application No. Hei-05-110538. Unlike the conventional technique described above, this conventional technique pays much attention to the secrecy of communication. FIGS. 17 and 18 show an example of the conventional technique. In FIGS. 17 and 18, reference numeral 115 represents a carrier wave generating circuit, reference numeral 116 represents a PSK modulation circuit, reference numeral 117 represents a spread spectrum mixing unit, and reference numeral 123 represents a PN sequence generating circuit. Reference numeral 123a represents a PN sequence generating circuit for the transmission side, and reference numeral 123b represents a PN sequence generating circuit for the reception side. In the PN sequence generating circuit, reference numeral 121 represents an FIFO (first-in first-out) element, reference numeral 118 represents a spread sequence clock generator, reference numeral 119 represents a frequency divider, and reference numeral 122 represents a PN sequence B generating circuit, which comprises K-staged shift register. Reference numeral 120 represents a DSP (digital signal processor), and PN sequence A data of two periods are stored in a built-in ROM. Reference numeral 124 represents a PSK demodulation circuit.

Next, the operation will be described. In this conventional technique, three modes of a mode 1, a mode 2 and a mode 3 are provided as a communication mode as shown in FIG. 19. Of these modes, in mode 1, the transmission side subjects a spread sequence A with no phase shift to spread modulation by A110 data, and then transmits the spread-modulated spread sequence A. The reception side establishes the synchronization of clocks of the spreading PN sequence during the reception of the signal of the mode 1. In mode 2, the transmission side spread-modulates the spread sequence A with no phase shift by M sequence data as in the same manner as described above. The M sequence data are set to notify it to the reception side that the phase of the PN spread sequence A is just afterwards shifted every period to be spectrum-spread. At this time, the coincidence between the reception data and the M sequence is checked by DSP 120 at the reception side, and if both are coincident with each other, the mode is shifted to the next mode 3. In the mode 3, the transmission side drives the K-staged shift register in the PN sequence B generating circuit 122 for phase shift by a clock obtained by frequency-dividing the clock for the spreading PN sequence A data into $1/(2^k-1)$ in the frequency-divider 119.

The K-staged shift register in the PN sequence B generating circuit 122 is shifted every one period of the spreading PN sequence A. The state of the K-staged shift register is read out by the DSP 120, and this value is converted to decimal numbers. The converted decimal number is given as a shift amount to the spreading PN sequence A, and serially input into an FIFO element 121. The phase-shifted PN sequence A data are output as an FIFO output from the FIFO element 121 by the clock for the spreading PN sequence A data. The FIFO output is multiplied by the output of the PSK modulation circuit 116 in a mixer at a subsequent stage to perform the spectrum spreading. As described above, the PN sequence for the data spreading is shifted on the basis of another PN sequence having a predetermined period every one period and then transmitted/received. Therefore, even when a third party knows the type of the spreading PN sequence and the clock synchronization is established, the third part can be prevented from continuing to eavesdrop the data.

The conventional spread spectrum communication systems as described above has a problem that the time required for the initial synchronization at the reception side can be shortened while keeping the communication secrecy. The following is the reason for this.

In the first conventional prior art, the initial synchronization at the reception side can be facilitated by continuously transmitting the spread code exclusively used for the synchronization. However, at the same time this conventional technique enables a third party to establish the initial synchronization, and thus the communication secrecy is not guaranteed. In order to enhance the secrecy in this conventional technique, the code length of the synchronizing PN code may be lengthened. However, this method also lengthens the initial synchronization time by a regular receiver, and thus the original object of this technique is lost.

Further, in the second conventional technique, the processing for enhancing the secrecy is complicated, so that it takes a long time until the initial synchronization is established at the reception side, and the construction of an implemented device is complicated.

SUMMARY OF THE INVENTION

An object of the present invention is to provide a spread spectrum communication system in which a regular receiver can readily establish initial synchronization.

Another object of the present invention is to provide a spread spectrum communication system in which the secrecy of communication to an irregular receiver is enhanced.

Further object of the present invention is to provide a spread frequency communication system which can be implemented by a circuit having a simple construction.

In order to attain the above objects, a spread spectrum communication system according to the present invention is characterized in that as base station transmission channels are used a synchronizing channel for continuously transmitting a predetermined PN code from a base station so that the predetermined PN code is exclusively used for initial synchronization acquisition with the base station in a mobile station, a identifying channel for continuously transmitting a predetermined multivalued PN code every base station so as to perform the identification of a communication base station and at the same time perform synchronization acquisition of a communication channel, and a communication channel for enabling the identification of a base station transmitting data by multiplying the multivalued PN code used in the identifying channel by communication data after spectrum spreading.

A transmission unit of the base station continuously transmits a synchronizing pilot channel which is exclusively used for the initial synchronization acquisition of the mobile station. Therefore, the mobile station can readily establish the initial synchronization with the base station.

Further, the transmission unit of the base station continuously transmits an identifying pilot channel which is exclusively used for the identification of the base station. Further, the identifying PN code of the identifying pilot channel is synchronized with a synchronous code of the synchronizing pilot channel, and a multivalued PN code whose period is an integer times of the synchronous code is used. Therefore, the mobile station which establishes synchronization with the synchronizing pilot channel can readily establish the synchronization of the identifying pilot channel.

Further, the transmission unit of the base station multiplies the data after the spectrum spreading of the communication channel by the same PN code as the identifying PN code used in the identifying pilot channel at the same phase timing, and then transmits the multiplication result. Therefore, the mobile station which establishes the synchronization with the identifying pilot channel can readily establish the communication channel.

Still further, in the above construction, the establishment of the synchronization is needed between the synchronizing pilot channel and the identifying pilot channel until the decoding of the communication channel. Accordingly, it is very difficult for an irregular receiver to decode the communication channel.

Still further, the identifying pilot channel is generated with the multivalued PN code. Therefore, the trial number at which a regular receiver must make to establish the synchronization is not dependent on the code period of the identifying PN code, but it may be at a polynomial level. However, the trial number at which an irregular receiver who does not know any method of generating the identifying pilot channel is dependent on the code period of the identifying PN code and thus it must be at an exponential function level.

The transmission unit of the spread spectrum communication system as described above includes: a communication channel modulation block which comprises an encoder for encoding data, a first PN generator for generating a PN code having a chip rate higher than the transmission data, a first multiplier for multiplying the output signal of the encoder and the PN code generated in the first PN generator, a first multivalued PN generator for receiving base station information to generate a multivalued PN code for base-station identification, a second multiplier for multiplying the multiplication result of the first multiplier and the PN code generated in the first multivalued PN generator, and a first oscillator for supplying an operation reference signal to the first PN generator and the first multivalued PN generator; an identifying pilot channel modulation block which comprises a second PN generator for receiving a code which is predetermined as a identifying pilot signal and generating a PN code having a chip rate higher than the identifying pilot signal data, a third multiplier for multiplying the identifying pilot signal data and the PN code generated in the second PN code generator, a second multivalued PN generator which has the same chip rate as the second PN generator and is input with the base station information to generate a base-station identifying multivalued PN code, a fourth multiplier for multiplying the multiplication result of the third multiplier and the PN code generated in the second multivalued PN generator, and a second oscillator for supplying an operation reference signal to the second PN generator and the second multivalued PN generator; a synchronizing pilot channel modulation block which comprises a third PN generator for receiving a code which is predetermined as a synchronizing pilot signal and generating a PN code having a chip rate higher than the synchronizing pilot signal data, a fifth multiplier for multiplying the synchronizing pilot signal data and the PN code generated in the third PN code generator, a fourth PN generator which has the same chip rate as the third PN generator and generates a PN code for synchronization acquisition, a sixth multiplier for multiplying the multiplication result of the fifth multiplier and the PN code generated in the fourth PN generator, and a third oscillator for supplying an operation reference signal to the third PN generator and the fourth PN generator; and an adder for adding the output of each of the channel modulation blocks.

The reception unit of the spread spectrum communication system according to the present invention includes: a communication channel demodulation block which comprises a third multivalued PN generator which receives a reception signal frequency-converted to an IF band in another radio demodulator and has the same construction as the first multivalued PN generator of the above-described communication channel modulation block, a seventh multiplier for multiplying the reception signal and the PN code generated in the third multivalued PN generator, a fifth PN generator which has the same construction as the first PN generator of the above-described communication channel modulation block, an eighth multiplier for multiplying the multiplication result of the seventh multiplier and the PN code generated in the fifth PN generator, a first pulse detector for detecting a peak pulse occurring in the output of the eighth multiplier, a first phase controller for controlling the phase of the PN codes generated in the fifth PN generator and the third multivalued PN generator on the basis of the detection result of the first pulse detector, a decoder which subjects the multiplication result of the eighth multiplier to decoding processing of the processing which is performed in the decoder of the above-described communication modulation block, and a fourth oscillator for supplying an operation reference signal to the fifth PN generator and the third multivalued PN generator; an identifying pilot channel demodulation block which comprises a fourth multivalued PN generator which receives a reception signal frequency-converted to an IF band in another radio decoder and has the same construction as the second multivalued PN code generator of the above-described identifying pilot channel modulation block, a ninth multiplier for multiplying the reception signal and the PN code generated in the fourth multivalued PN generator, a sixth PN code generator having the same construction as the second PN code generator of the above-described pilot channel modulation block, a tenth multiplier for multiplying the multiplication result of the ninth multiplier and the PN code generated in the sixth PN code generator, a second pulse detector for detecting a peak pulse occurring in the output of the tenth multiplier, a second phase controller for controlling the phase of the PN codes generated in the sixth PN generator and the fourth multivalued PN generator on the basis of the detection result of the second pulse detector, and a fifth oscillator for supplying an operation reference signal to the sixth PN generator and the fourth multivalued PN generator; and a synchronizing pilot channel demodulation block which comprises a seventh PN code generator which receives a reception signal frequency-converted to an IF band in another radio demodulator and has the same construction as the fourth PN generator of the above-described synchronizing pilot channel modulation block, an eleventh multiplier for multiplying the reception signal and the PN code generated in the seventh PN generator, an eighth PN generator having the same construction as the third PN generator of the above-described synchronizing pilot channel modulation block, a twelfth multiplier for multiplying the eleventh multiplier and the PN code generated in the eighth PN generator, a third pulse detector for detecting a peak pulse occurring in the output of the twelfth multiplier, a third phase controller for controlling the PN codes generated in the seventh PN generator and the eighth PN generator on the basis of the detection result of the third pulse detector, and a third oscillator for supplying an operation reference signal to the seventh PN generator and the eighth PN generator.

The transmission unit of the spread spectrum communication system includes: a communication channel modulation block which comprises an encoder for receiving transmission data and encoding the data, a first PN generator for generating a PN code having a chip rate higher than the transmission data, a first multiplier for multiplying the output signal of the encoder and the PN code generated in the first PN generator, a first multivalued PN generator which has the same chip rate at the first PN generator and receives base station information to generate a base-station identifying multivalued PN code, a second multiplier for multiplying the multiplication result of the first multiplier and the PN code generated in the multivalued PN generator, and a first oscillator for supplying an operation reference signal to the first PN generator and the first multivalued PN generator; an identifying pilot channel modulation block which comprises a second PN generator for receiving identifying pilot data and generating a PN code having a chip rate higher than the input data, a third multiplier for multiplying the input data and the PN code generated in the second PN generator, a third PN generator which has the same chip rate as the second PN generator and generates a PN code for synchronous acquisition, a second multivalued PN generator which has the same chip rate as the second PN generator and receives base station information to generate a multivalued PN code for base-station identification, a first switching unit for selecting the output of the second multivalued PN generator from the output of the third PN generator and the output of the second multivalued PN generator, a fourth multiplier for multiplying the output of the third multiplier and the output signal of the first switching unit, and a second oscillator for supplying an operation reference signal to the second PN generator, the third PN generator and the second multivalued PN generator; a synchronizing pilot channel modulation block which has the same construction as the identifying pilot channel modulation block and in which the first switching unit selects the third PN generator; and an adder for adding the output of each of the channel modulation blocks.

The transmission unit of the spread spectrum communication system of the present invention includes a communication channel modulation block which comprises an encoder for receiving transmission data to encode the input data, a transmission path through which the input data pass when the input data are not subjected to the encoding processing, a first switching unit for inputting the input signal to the encoder of the encoder and the transmission path, a second switching unit for selecting the output of the encoder in the outputs of the encoder and the transmission path, a first PN generator for generating a PN code having a chip rate higher than the input data, a first multiplier for multiplying the input data passing through the second switching unit and the PN code generated in the first PN generator, a second PN generator which has the same chip rate as the first PN generator and generates a PN code for synchronous acquisition, a multivalued PN generator which has the same chip rate as the first PN generator and receives base station information to generate a multivalued PN code for base station identification, a third switching unit for selecting the output of the second PN generator from the output of the second PN generator and the output of the multivalued PN generator, a second multiplier for multiplying the output of the first multiplier and the output signal of the third switching unit, and an oscillator for supplying an operation reference signal to the first PN generator, the second PN generator and the multivalued PN generator; an identifying pilot channel modulation block which has the same construction as the communication channel modulation block and receives identifying pilot data and in which both the first and second switching units select the transmission path, and the third switching unit selects the multivalued PN generator; and a synchronizing pilot channel modulation block which has the same construction as the communication channel modulation block and receives synchronizing pilot data and in which both the first and second switching units select the transmission path, and the third switching unit selects the second PN generator; and an adder for adding the output of each of the channel modulation blocks.

The reception unit of the spread spectrum communication system according to the present invention includes: a communication channel demodulation block which comprises a third multivalued PN generator which receives a reception signal frequency-converted to an IF band in another radio decoder and has the same construction as the first multivalued PN generator of the above-described communication channel modulation block, a seventh multiplier for multiplying the reception signal and the PN code generated in the third multivalued PN generator, a fifth PN generator having the same construction as the first PN generator of the above-described communication channel modulation block, an eighth multiplier for multiplying the multiplication result of the seventh multiplier and the PN code generated in the fifth PN generator, a first pulse detector for detecting a peak pulse occurring in the output of the eighth multiplier, a first phase controller for controlling the phase of the PN codes generated in the fifth PN generator and the third multivalued PN generator on the basis of the detection result of the first pulse detector, a decoder for performing decoding processing of the processing which is conducted on the multiplication result of the eighth multiplier in the encoder of the above-described communication channel modulation block, and a fourth oscillator for supplying an operation reference signal to the fifth PN generator and the third multivalued PN generator; an identifying pilot channel demodulation block which comprises a fourth multivalued PN generator which receives a reception signal frequency-converted to an IF band in another radio demodulator and has the same construction as the second multivalued PN code generator of the above-described identifying pilot channel modulation block, a sixth PN generator having the same construction as the fourth PN code generator of the above-described synchronizing pilot channel modulation block, a switching unit for selecting the output of the fourth multivalued PN generator from the output of the sixth PN generator and the output of the fourth multivalued PN generator, a ninth multiplier for multiplying the output of the fourth multivalued PN generator selected by the switching unit and the reception signal, a seventh PN code generator for generating an despread code of the reception signal, a tenth multiplier for multiplying the multiplication result of the ninth multiplier and the PN code generated in the seventh PN code generator, a second pulse detector for detecting a peak pulse occurring in the output of the tenth multiplier, a second phase controller for controlling the phase of the PN codes generated in the sixth PN generator, the seventh PN generator and the fourth multivalued PN generator on the basis of the detection result of the second pulse detector, and a fifth oscillator for supplying an operation reference signal to the sixth PN generator, the fourth multivalued PN generator and the seventh PN generator; and a synchronizing pilot channel decoding block which has the same construction as the identifying pilot channel decoding block and in which the switching unit selects the output of the sixth PN generator.

The reception unit of the spread spectrum communication system according to the present invention includes: a communication pilot channel demodulation block which comprises a fifth PN generator for generating a synchronizing code, a third multivalued PN generator for generating an identifying code, a first switching unit for selecting the output of the fifth PN generator from the output of the fifth PN generator and the output of the third multivalued PN generator, a seventh multiplier for multiplying the output of the fifth PN generator selected by the first switching unit and the reception signal, a sixth PN generator for generating a spread code, an eighth multiplier for multiplying the multiplication result of the seventh multiplier and the PN code generated in the sixth PN generator, a pulse detector for detecting a peak pulse occurring in the output of the eighth multiplier, a phase controller for controlling the phase of the PN codes generated in the sixth PN generator, the fifth PN generator and the third multivalued PN generator on the basis of the detection result of the pulse detector, a fourth oscillator for supplying an operation reference signal to the sixth PN generator, the fifth PN generator and the third multivalued PN generator, a decoder for demodulating the communication channel, a transmission path which is used when the identifying pilot channel or the synchronizing pilot channel is demodulated without the decoder, and second and third switching units for selecting the decoder from the decoder and the transmission path; an identifying pilot channel demodulation block which has the same construction as the communication pilot channel demodulation block and in which the first switching unit selects the output of the third multivalued PN generator and the second and third switching units select the transmission path; and a synchronizing pilot channel demodulation block which has the same construction as the communication pilot channel demodulation block and in which the first switching unit selects the output of the fifth PN generator and the second and third switching units select the transmission path.

BRIEF DESCRIPTION OF THE DRAWINGS

FIGS. 4a to 4c are a diagram showing examples of a synchronizing pilot channel and an identifying pilot channel which are generated in the transmission unit of the base station of FIG. 1;

FIGS. 5a to 5c are a diagram showing other examples of the synchronizing pilot channel and the identifying pilot channel generated in the transmission unit of the base station of FIG. 1;

FIGS. 21A and 21B are a diagram showing the basic construction of a transmission unit of a base station and a reception unit of a mobile station which hare used in a mobile communication system.

DETAILED DESCRIPTION OF THE PREFERRED EMBODIMENTS

Preferred embodiments according to the present invention will be described hereunder with reference to the accompanying drawings.

Figure 1:
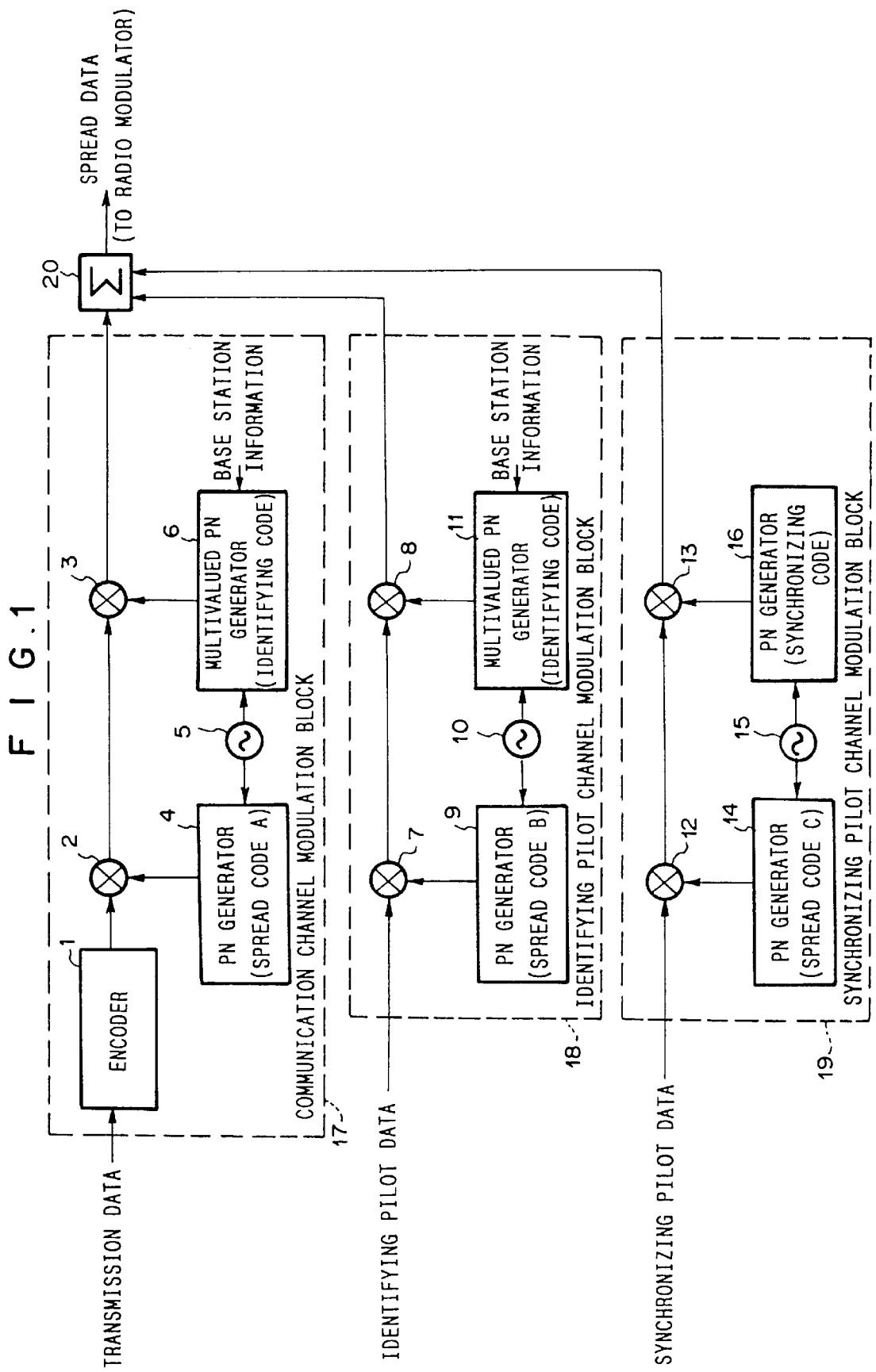
FIG. 1 is a diagram showing the construction of a transmission unit of a base station in a spread spectrum communication system according to a first embodiment of the present invention.

FIG. 1 is a diagram showing the construction of a spread spectrum communication system according to a first embodiment of the present invention.

Referring to FIG. 1, the transmission unit of the spread spectrum communication system according to the first embodiment of the present invention comprises a communication channel modulation block 17 for generating a communication channel, an identifying pilot channel modulation block 18 for generating a base-station identifying pilot channel, a synchronizing pilot channel modulation block for generating a synchronizing pilot channel, and an adder 20 for adding the output of the respective channel modulation blocks 17, 18 and 19.

The communication channel modulation block 17 comprises an encoder 1 which is supplied with transmission data as input data to encode the input data (error correction, scramble, etc.), a PN generator 4 for generating a PN code having a chip rate higher than the transmission data, a multiplier 2 for multiplying the output signal of the encoder 1 and the PN code generated in the PN generator 4, a multivalued PN generator 6 which has the same chip rate as the PN generator 4 and receives base station information to generate a multivalued PN code for base-station identification, a multiplier 3 for multiplying the multiplication result of the multiplier 2 and the PN code generated in the multivalued PN generator 6, and an oscillator 5 for supplying an operation reference signal to the PN generator 4 and the multivalued PN generator 6.

The identifying pilot channel modulation block 18 comprises a PN code generator 9 which is supplied with a code which is predetermined as an identifying pilot signal (for example, all "0", all "1" or the like) to generate a PN code having a chip rate higher than the identifying pilot signal data, a multiplier 7 for multiplying the identifying pilot signal data and the PN code generated in the PN code generator 9, a multivalued PN generator 11 which has the same chip rate as the PN generator 9 and receives base station information to generate a base-station identifying multivalued PN code, a multiplier 8 for multiplying the multiplication result of the multiplier 7 and the PN code generated in the multivalued PN generator 11, and an oscillator 10 for supplying an operation reference signal to the PN generator 9 and the multivalued PN generator 11. The oscillators 5, 10 and 15 oscillate the same frequency in synchronism with one another.

Further, the synchronizing pilot channel modulation block comprises a PN code generator 14 which is supplied with a code which is predetermined as a synchronizing pilot signal (for example, all "0", all "1" or the like) to generate a PN code having a chip rate higher than the synchronous pilot signal data, a multiplier 12 for multiplying the synchronizing pilot signal data and the PN code generated in the PN code generator 14, a PN generator 16 which as the same chip rate as the PN generator 14 and generates a PN code for synchronous acquisition, a multiplier 13 for multiplying the multiplication result of the multiplier 12 and the PN code generated in the PN generator 16, and an oscillator 15 for supplying an operation reference signal to the PN generator 14 and the PN generator 16.

Figure 2:
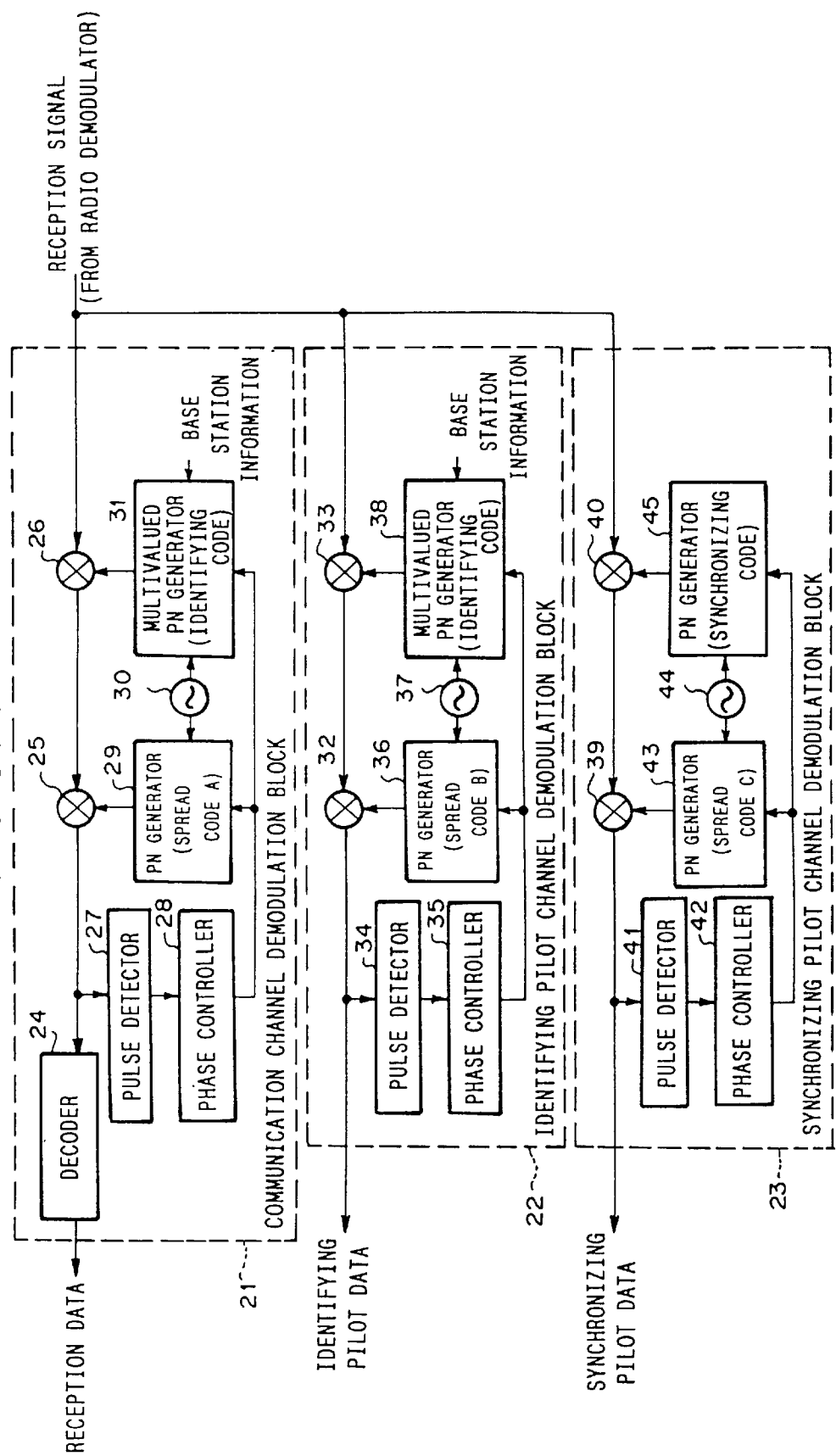
FIG. 2 is a diagram showing the construction of a reception unit of a mobile station in the spread spectrum communication system according to the first embodiment of the present invention.

FIG. 2 is a diagram showing the construction of the reception unit of the spread spectrum communication system according to a first embodiment of the present invention. The reception unit mainly comprises a communication channel demodulation block 21, an identifying pilot channel demodulation block 22, and a synchronizing pilot channel demodulation block 23.

The communication channel demodulation block 21 comprises a multivalued PN generator 31 which is input with a reception signal which is frequency-converted to an IF band in another radio demodulator and which has the same construction as the multivalued PN generator 6 of the communication channel modulation block 17, a multiplier 26 for multiplying the reception signal and the PN code generated in the multivalued PN generator 31, a PN generator 29 having the same construction as the PN generator 4 of the communication channel modulation block 17, a multiplier 25 for multiplying the multiplication result of the multiplier 26 and the PN code generated in the PN generator 29, a pulse detector 27 for detecting a peak pulse occurring in the output of the multiplier 25, a phase controller 28 for controlling the phase of the PN codes generated in the PN generator 29 and the multivalued PN generator 31 on the basis of the detection result of the pulse detector 27, a decoder 24 for subjecting the multiplication result of the multiplier 25 to the decoding processing (viterbi decoding, deinterleave, etc.) to the processing such as error correction, interleaving processing, etc. which is performed in the encoder 1 of the communication channel modulation block 17, and an oscillator 30 for supplying an operation reference signal to the PN generator 29 and the multivalued PN generator 31.

The identifying pilot channel demodulation block 22 comprises a multivalued PN generator 38 which has the same construction as the multivalued PN code generator 11 of the identifying pilot channel modulation block 18 and receives a reception signal which is frequency-converted to an IF band in another radio demodulator, a multiplier 33 for multiplying the reception signal and the PN code generated in the multivalued PN generator 38, a PN code generator 36 having the same construction as the PN code generator 9 of the identifying pilot channel modulation block 18, a multiplier 32 for multiplying the multiplication result of the multiplier 26 and the PN code generated in the PN code generator 36, a pulse detector 34 for detecting a peak pulse occurring in the output of the multiplier 32, a phase controller 35 for controlling the phase of the PN codes generated in the PN generator 36 and the multivalued PN generator 38 on the basis of the detection result of the pulse detector 34, and an oscillator 37 for supplying an operation reference signal to the PN generator 36 and the multivalued PN generator 38.

Further, the synchronizing pilot channel demodulation block 23 comprises a PN code generator 45 which is input with a reception signal which is frequency-converted to an IF band in another radio demodulator and has the same construction as the PN generator 16 of the synchronizing pilot channel modulation block, a multiplier 40 for multiplying the reception signal and the PN code generated in the PN generator 45, a PN generator 43 having the same construction as the PN generator 14 of the synchronizing pilot channel modulation block 19, a multiplier 39 for multiplying the multiplication result of the multiplier 40 and the PN code generated in the PN generator 43, a pulse detector 41 for detecting a peak pulse occurring in the output of the multiplier 39, a phase controller 42 for controlling the phase of the PN codes generated in the PN generator 43 and the PN generator 45 on the basis of the detection result of the pulse detector 41, and an oscillator 44 for supplying an operation reference signal to the PN generator 43 and the PN generator 45.

Next, the operation of the transmission unit shown in FIG. 1 will be described hereunder.

In the transmission unit of the base station, the synchronizing pilot channel and the identifying pilot channel are transmitted at all times, or a desired number of communication channels are transmitted. Further, in addition to the above channels, a control channel may be transmitted from a base station for the purpose of notification to a mobile station.

First, a modulation method of the synchronizing pilot channel will be described.

A bit array (for example, all "0") which is predetermined as synchronizing pilot channel data is input, and the input bit array and the PN code generated in the PN generator 14 are multiplied by the multiplier 12. In this case, as the PN code is a code which is predetermined as being exclusively used for the synchronizing pilot channel (this code is referred to as "spread code C"). The spread code C which is generated in the PN generator 14 has a chip rate which is remarkably higher than the bit rate of the input bit array. Therefore, the spectrum of the input bit array is spread by the above multiplication. The output of the multiplier 12 which has been spectrum-spread is multiplied by the PN code generated in the PN generator 16 in the multiplier 13. Here, it is assumed that the PN code thus generated in the PN generator 16 is common to and synchronized in all the base stations and has the same chip rate as the spread code C. An example of the synchronizing pilot channel data thus generated is shown in (a) of FIG. 4. In this case, there are provided synchronizing pilot channel output data when all "0" is set as a bit array of the synchronizing pilot channel, all "0" is set as the spread code C, and "1011" is set as a synchronizing code, respectively.

Next, a modulation method of the identifying pilot channel will be described. A bit array (for example, all "0") which is predetermined as identifying pilot channel data is input, and the input bit array and the PN code generated in the PN generator 9 are multiplied by the multiplier 7.

In this case, as the PN code is used a code which is predetermined as being exclusively used for the identifying pilot channel (this is referred to as "spread code B"). Here, the spread code B generated in the PN generator 9 has a chip rate which is extremely higher than the bit rate of the input bit array and is the same as the spread code C used to generate the synchronizing pilot channel. Therefore, by this multiplication, the spectrum of the input bit array is spread to have the same band width of the synchronizing pilot channel. The output of the multiplier 7 which is spectrum-spread is multiplied by the PN code generated in the multivalued PN generator 11 in the multiplier 8, and output as transmission data of the identifying pilot channel.

Figure 3:
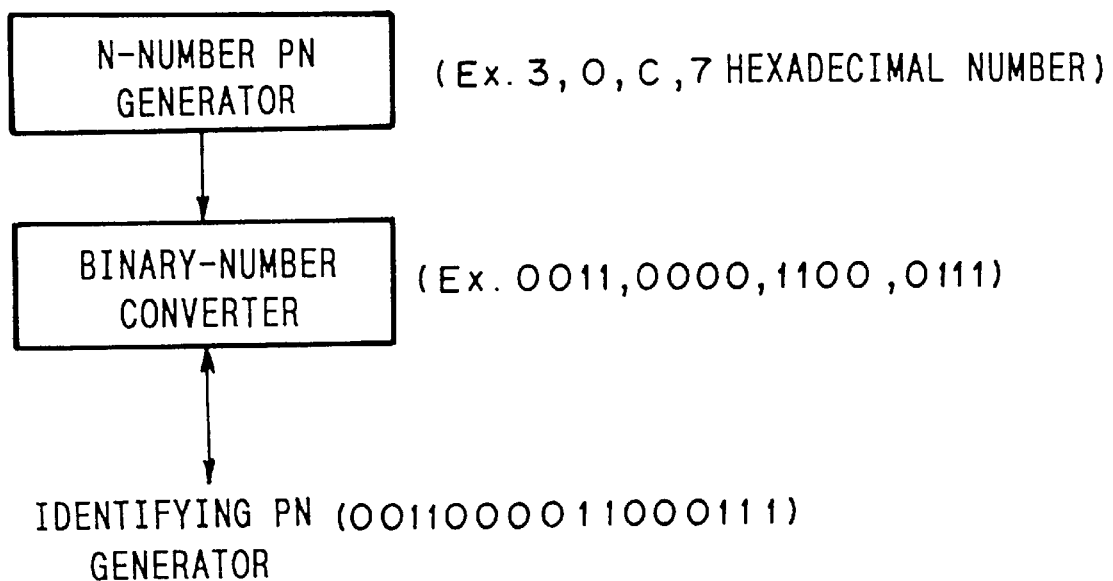
FIG. 3 is a diagram showing the construction of multivalued PN generators 6 and 11 in FIG. 1 and the outputs thereof.

In the multivalued PN generator 11, the base station information is input to generate an identifying PN code which is exclusively used for the base station corresponding to the base station information. In this case, a multivalued PN code is first generated in the multivalued PN generator, and the multivalued PN code thus generated is converted to a binary number in a binary converter and then set as an output of the multivalued PN generator 11 (see FIG. 3). As a method of generating an identifying code which is different at each base station, there may be implemented a method of shifting the absolute phase of the same multivalued PN every base station or a method of using a completely different multivalued PN every base station. Any one of the methods may be used. (b) and (c) of FIG. 4 show examples of identifying pilot channel data which are generated by using multivalued PNs which are different in the absolute phase among base stations, and (b) and (c) of FIG. 5 show examples of identifying pilot channel data which are generated by using multivalued PNs which are absolutely different among base stations. In this case, there are provided the output data of the identifying pilot channel when all "0" is used as a bit array of the identifying pilot channel, "0101 . . . " is used as the spread code B, and "30C7" (binary expression: "0011000011000111") is used as an identifying code.

Finally, a modulation method of the communication channel will be described. In the case of the communication channel, in many cases the signal processing such as error correction coding processing, interleave or the like may be performed to keep the data quality, enhance secrecy or moderate the burst of data error. Accordingly, an information bit array of voice or the like which is an input of the communication channel is first subjected to encoding processing in the encoder 1. The encoding processing is not necessarily required. The information bit array which has been processed in the encoder 1 is multiplied by the PN code generated in the PN generator 4 by the multiplier 2. Here, it is assumed that the PN code generated in the PN generator 4 is not fixed, but freely selected from plural kinds of PN codes which are generated in the PN generator 4 every time the communication channel is generated (excluding codes which have been already reserved for the synchronizing pilot channel and the identifying pilot channel). In this case, the spread code A is assumed to be selected. The spread code A generated in the PN generator 4 has a chip rate which is remarkably higher than the bit rate of the input bit array and is identical to the chip rate of the spread code C used to generate the synchronizing pilot channel and the spread code B used to generate the identifying pilot channel.

Therefore, by this multiplication, the spectrum of the input bit array is spread to the same band width as the synchronizing pilot channel and the identifying pilot channel. The output of the multiplier 2 which is spectrum-spread is further multiplied by the PN code generated in the multivalued PN generator 6 in the multiplier 3, and output as the transmission data of the communication channel. Here, the PN code generated in the multivalued PN generator 6 is perfectly identical in timing and PN sequence to the PN code generated in the multivalued PN generator 11 of the identifying pilot channel modulation block 18. Accordingly, with respect to the data of the communication channel to be transmitted, the base station serving as a transmitter can be identified on the basis of the identifying code.

Figure 6:
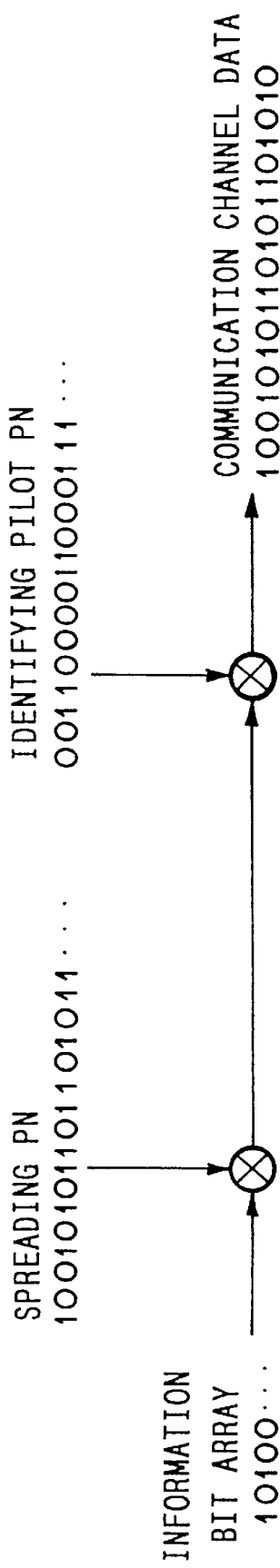
FIG. 6 is a diagram showing an example of a communication channel generated in the transmission unit of the base station of FIG. 1.

FIG. 6 shows an example of the data of the communication channel thus generated. In this case, a synchronizing pilot channel shown in FIG. 4 and an identifying pilot channel shown in FIG. 5 are used.

In the above operation, the synchronization is established between the PN generator 4 and the multivalued PN generator 6, between the PN generator 9 and the multivalued PN generator 11 and between the PN generator 14 and the PN generator 16 respectively. Further, the head of the identifying code generated in the multivalued PN generator 6 and the multivalued PN generator 11 is certainly coincident with the head of the synchronizing code generated in the PN generator 16 at a fixed period. That is, it is assumed that the period of the identifying code is an integral multiple of the period of the synchronizing code, and the head of the identifying code is coincident with the head of the synchronizing code. Likewise, the period of the spread code generated in the PN generators 4, 9 and 14 is assumed to be an integral multiple of the period of the identifying code.

Next, the operation of the reception unit of the mobile station will be described.

In the reception unit of the mobile station, the synchronizing pilot channel, the identifying pilot channel and the communication channel which are transmitted from the base station are received and demodulated.

At a first stage, the mobile station receives and demodulates the synchronizing pilot channel demodulation block 23 to establish the initial synchronization with the base station. First, the spread code C is generated in the PN generator 43 as in the case of the PN generator 14 of the transmission unit of the base station, and at the same time the synchronizing code is generated in the PN generator 45 as in the case of the PN generator 16 of the transmission unit of the base station. Since it is predetermined that the synchronizing pilot channel is spectrum-spread by the spread code C, the mobile station can recognize that it is sufficient to generate the spread code C under no restrictions, and thus the mobile station can generate the synchronizing code under no restrictions because the synchronizing code is common to all the base stations.

At a second stage, the mobile station multiplies the reception signal by the synchronizing code generated in the PN generator 45 and the spread code C generated in the PN generator 43 in order to synchronize the spread code C generated by itself and the spread code C contained in the reception signal, and the phase of the PN generator 43 and the phase of the PN generator 45 are controlled by the phase controller 42 so that a peak pulse can be detected in the multiplication output in the pulse detector 41. Here, when the spread code C contained in the reception signal and the spread code C generated in the PN generator 43 of the mobile station are varied in phase, a bit (chip) array having the same spectral band as the reception signal occurs in the multiplication result, and only signals which are substantially at the noise level are detected in the pulse detector 41.

Figure 7:
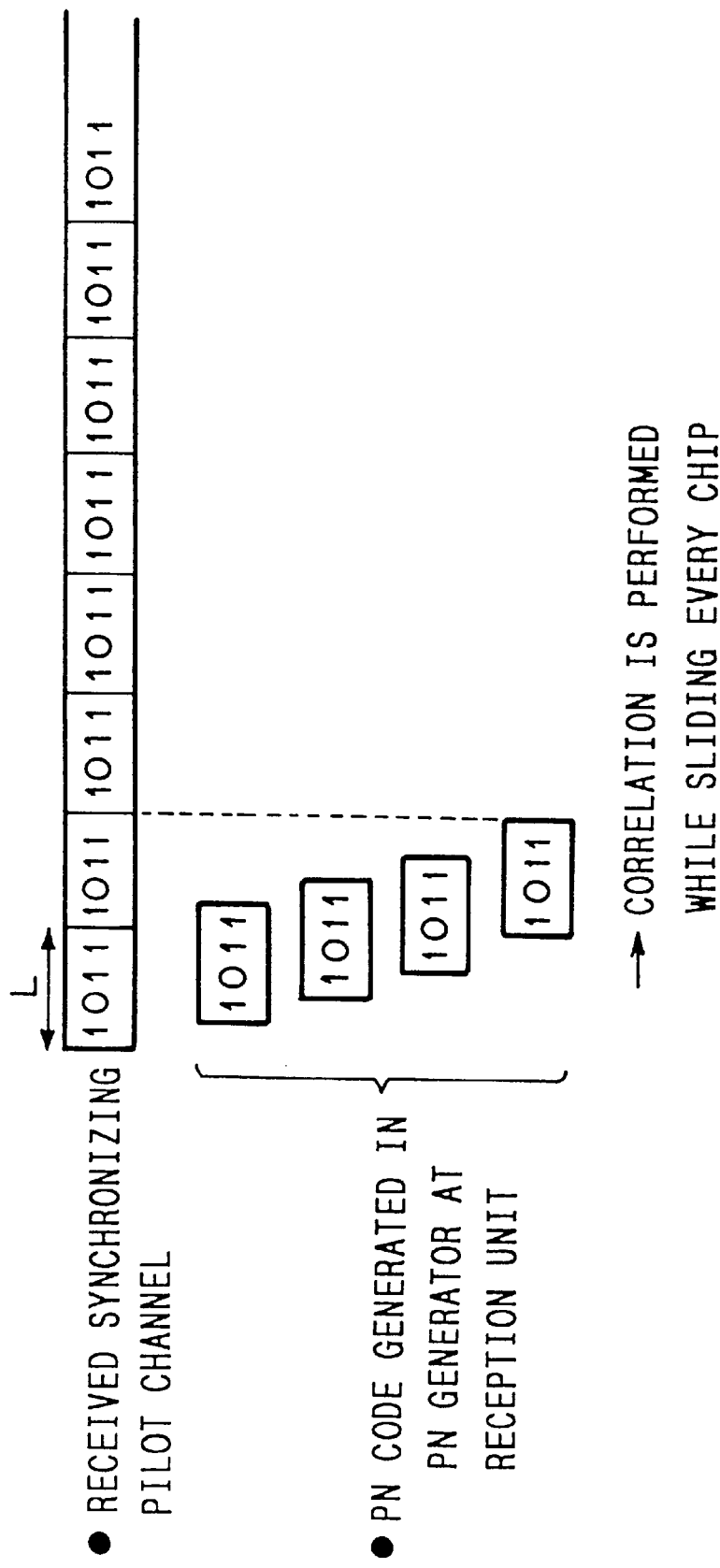
FIG. 7 is a diagram showing an example of synchronous acquisition of the synchronizing pilot channel in a synchronizing pilot channel demodulation block 23 of FIG. 2.

On the other hand, when the spread code C in the reception signal and the spread code C generated in the PN generator 43 are synchronized with each other (or nearly synchronized with each other), a bit array which is despreaded is restored in the multiplication result, and at this time a large peak pulse continues to occur. Accordingly, the phase controller 42 slides the phase of the PN codes generated in the PN generator 43 and the PN generator 45 every chip (or every amount less than one chip) so that the largest peak pulse can be continuously detected in the pulse detector 41 to perform the synchronous acquisition with the reception signal. At the same time, the phase controller 42 controls the phase of the PN generator 43 and the phase of the PN generator 45 to follow the synchronization (see FIG. 7).

If the synchronization acquisition of the synchronizing pilot channel succeeds as described above, the mobile station performs the synchronous acquisition of the identifying pilot channel at a third stage. The synchronous acquisition is performed in the identifying pilot channel demodulation block 22 of FIG. 2. As described above, the spread code B and the identifying code which are used in the identifying pilot channel modulation block 18 of the transmission unit are predetermined as described above, and thus the mobile station which tries to establish the synchronization of the identifying pilot channel can generate the spread code B and the identifying code under no restrictions.

Further, the mobile station multiplies the reception signal by the spread code B generated in the PN generator 36 and the identifying code generated in the multivalued PN generator 38 as in the case of the synchronous acquisition of the synchronizing pilot channel as described above, and performs the phase control of the PN generators 37 and 38 in the phase controller 35 so that a peak pulse is detected in the multiplication result. However, at this stage the mobile station know that the synchronization with the synchronizing pilot channel has been already established and the head of the identifying code is coincident with any head of the synchronizing code, and thus the phase controller 35 is operated to establish the synchronization with the identifying code, not by the sliding operation on a chip basis, but by the sliding operation every period of the synchronizing code while synchronizing to the synchronizing pilot channel.

Figure 8:
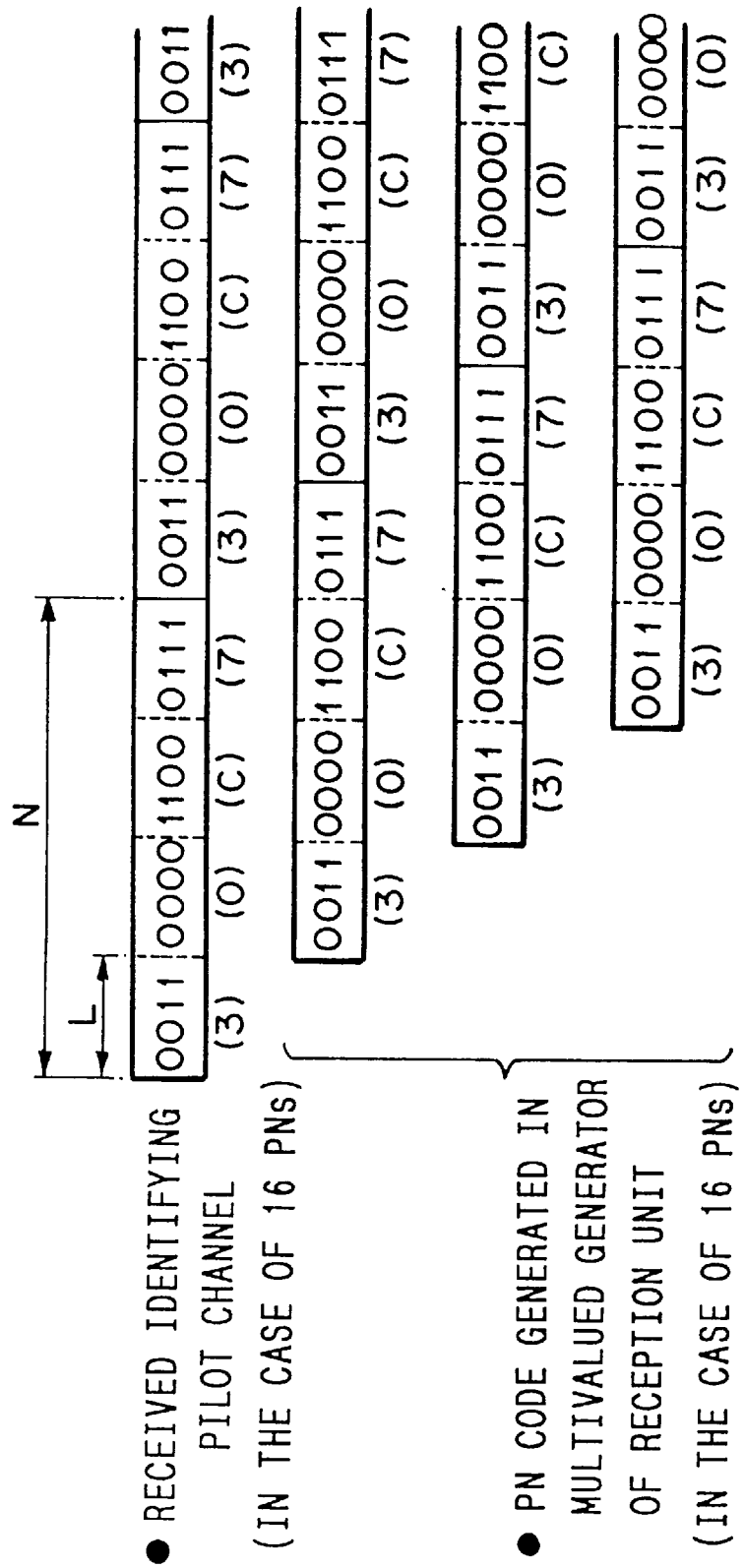
FIG. 8 is a diagram showing the synchronous acquisition of the identifying pilot channel in an identifying pilot channel demodulation block 22.

The foregoing description is applied to the case where the identification of the base station is performed by varying the absolute phase of the same PN sequence as the identifying code. However, the same is applied to the case where the absolutely different PN sequences are allocated to respective base stations as identifying codes. That is, in this case, the sliding operation is carried out every period of the synchronizing code in the phase controller 35 and then all kinds of identifying codes are correlated with the reception signal, thereby checking the establishment of the synchronization (see FIG. 8).

Figure 9:
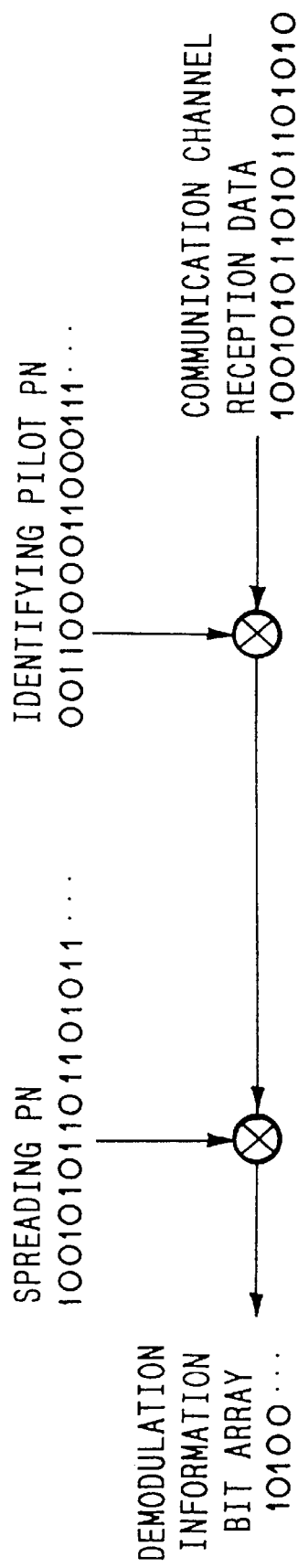
FIG. 9 is a diagram showing an example of the demodulation of the communication channel in a communication channel demodulation block 21 of FIG. 2.

Finally, the demodulation of the communication channel is performed in the communication channel demodulation block 21. If the synchronization of the identifying pilot channel is established, the communication channel can be demodulated by generating the spread code A and the identifying code in the PN generator 29 and the multivalued PN generator 31 respectively and then multiplying the reception signal by these codes. At this time, as described above, any spread code is allocated to the communication channel every time the communication channel is generated. Therefore, the mobile station does not know the spread code with which the communication channel to be received by the mobile station itself is spectrum-spread. However, the spread code concerned is notified by another control channel or the like to be transmitted from the base station, so that the mobile station can generate an accurate PN code (spread code A) on the basis of this notification. The reception signal which is demodulated by the despreading is subjected to the error correction, the deinterleave processing, etc. in the decoder 24 to perform the decoding of the reception data (see FIG. 9).

Figure 10:
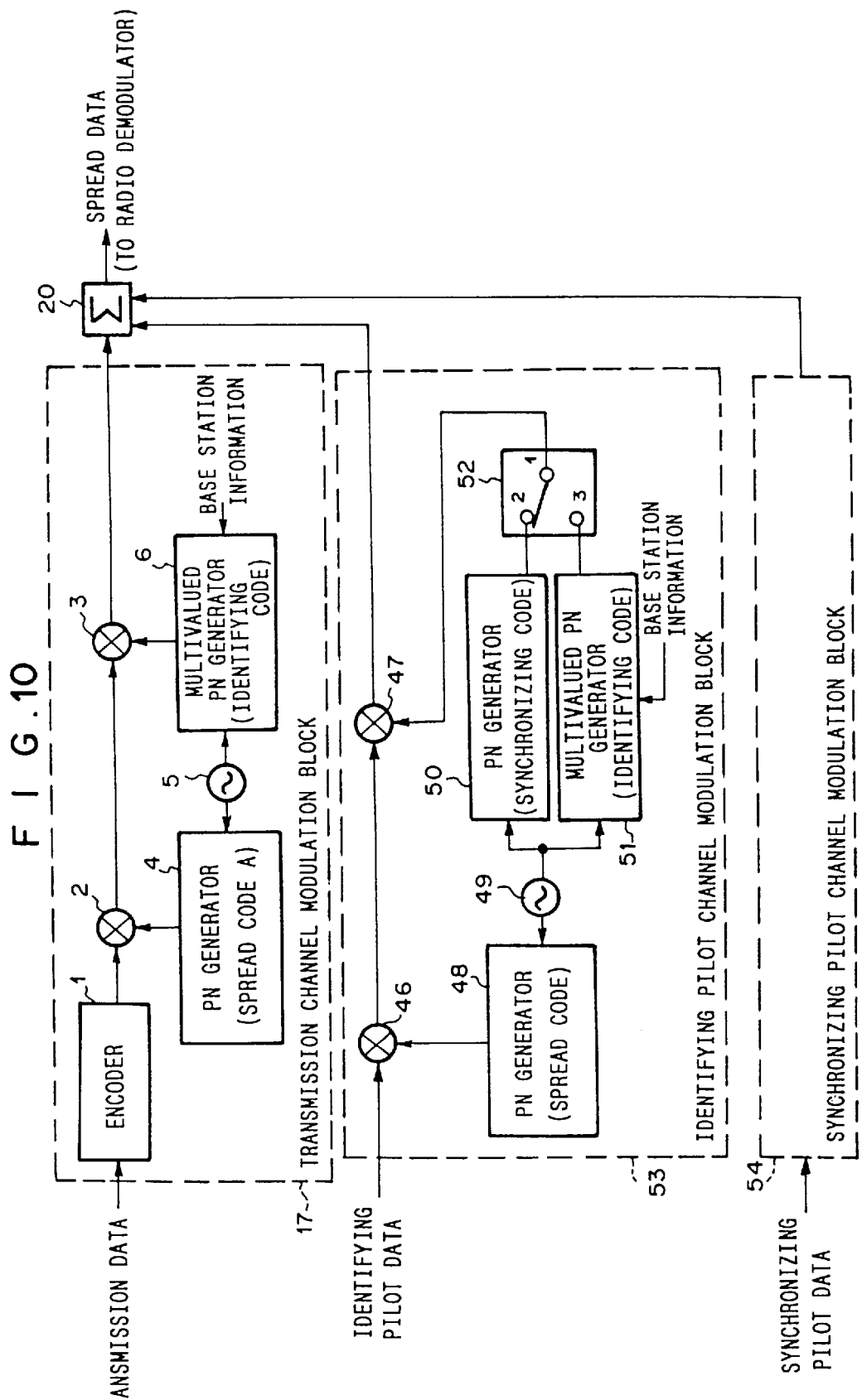
FIG. 10 is a diagram showing the construction of the transmission unit of the base station of the spread spectrum communication system according to a second embodiment of the invention.

FIG. 10 is a diagram showing the construction of the transmission unit of the spread spectrum communication system according to a second embodiment of the present invention. The difference from the first embodiment shown in FIG. 1 resides in that the modulation blocks of the identifying pilot channel and the synchronizing pilot channel are made common. This common design enables the respective modulation blocks to be manufactured in the same process. In FIG. 10, the internal construction of the modulation block of the synchronizing pilot channel is identical to that of the modulation block of the identifying pilot channel, and the common parts are represented by the same reference numerals.

The transmission unit comprises a communication channel modulation block 17, pilot channel modulation blocks 53 and 54, and an adder 20. The identifying pilot channel/synchronizing pilot channel modulation block 53, 54 comprises a PN generator 48 for receiving pilot data (any one of identifying pilot data and synchronizing pilot data) to generate a PN code having a chip rate higher than the input data, a multiplier 46 for multiplying the input data and the PN code generated in the PN generator 48, a PN generator 50 which has the same chip rate as the PN generator 48 and generates the PN code for synchronization acquisition, a multivalued PN generator 51 which has the same chip rate as the PN generator 48 and is input with base-station information to generate a base-station identifying multivalued PN code, a switching unit 52 for selecting the output of the PN generator 50 and the output of the multivalued PN generator 51, a multiplier 47 for multiplying the output of the multiplier 46 and the output signal of the switching unit 52, and an oscillator 49 for supplying an operation reference signal to the PN generator 48, the PN generator 50 and the multivalued PN generator 51.

Next, the operation of the second embodiment will be described.

The operation of the communication channel modulation block 17 is the same as the first embodiment of FIG. 1, and thus the description thereof is omitted. First, an operation of modulating the identifying pilot channel data in the identifying pilot channel modulation block 53 will be described.

In the multiplier 46, the input identifying pilot channel data are multiplied by the spread code exclusively used for the identifying pilot channel generated in the PN generator 48 (i.e., the spread code B of FIG. 1). Further, in the multivalued PN generator 51, the base-station information is input to generate an identifying code having the same chip rate as the spread code B, and the identifying code thus generated is output to the switching unit 52. The switching unit 52 is switched so that the switching terminal thereof is connected to a contact point 3 to connect the multivalued PN generator 51 and the multiplier 47. In the multiplier 47, the multiplication result of the multiplier 46 is multiplied by the PN code generated in the multivalued PN generator 51 which is selected by the switching unit 52, and output to the adder 20.

Next, an operation of modulating the synchronizing pilot channel data in the synchronizing pilot channel modulation block 54 will be described.

In the multiplier 46, the input synchronizing pilot channel data is multiplied by the spread code used exclusively for the synchronizing pilot channel generated in the PN generator 48 (the spread code C of FIG. 1). Further, in the PN generator 50, the synchronizing code having the same chip rate as the spread code C is generated, and output to the switching unit 52. The switching unit 52 is switched so that the switching terminal thereof is connected to a contact point 2 to connect the PN generator 50 and the multiplier 47. In the multiplier 47, the multiplication result of the multiplier 46 is multiplied by the PN code generated in the PN generator 50 which is selected by the switching unit 52, and output to the adder 20.

By using the pilot modulation block having the same construction as described above, the circuit construction is made common and at the same time redundancy is provided to failure and other troubles.

Figure 11:
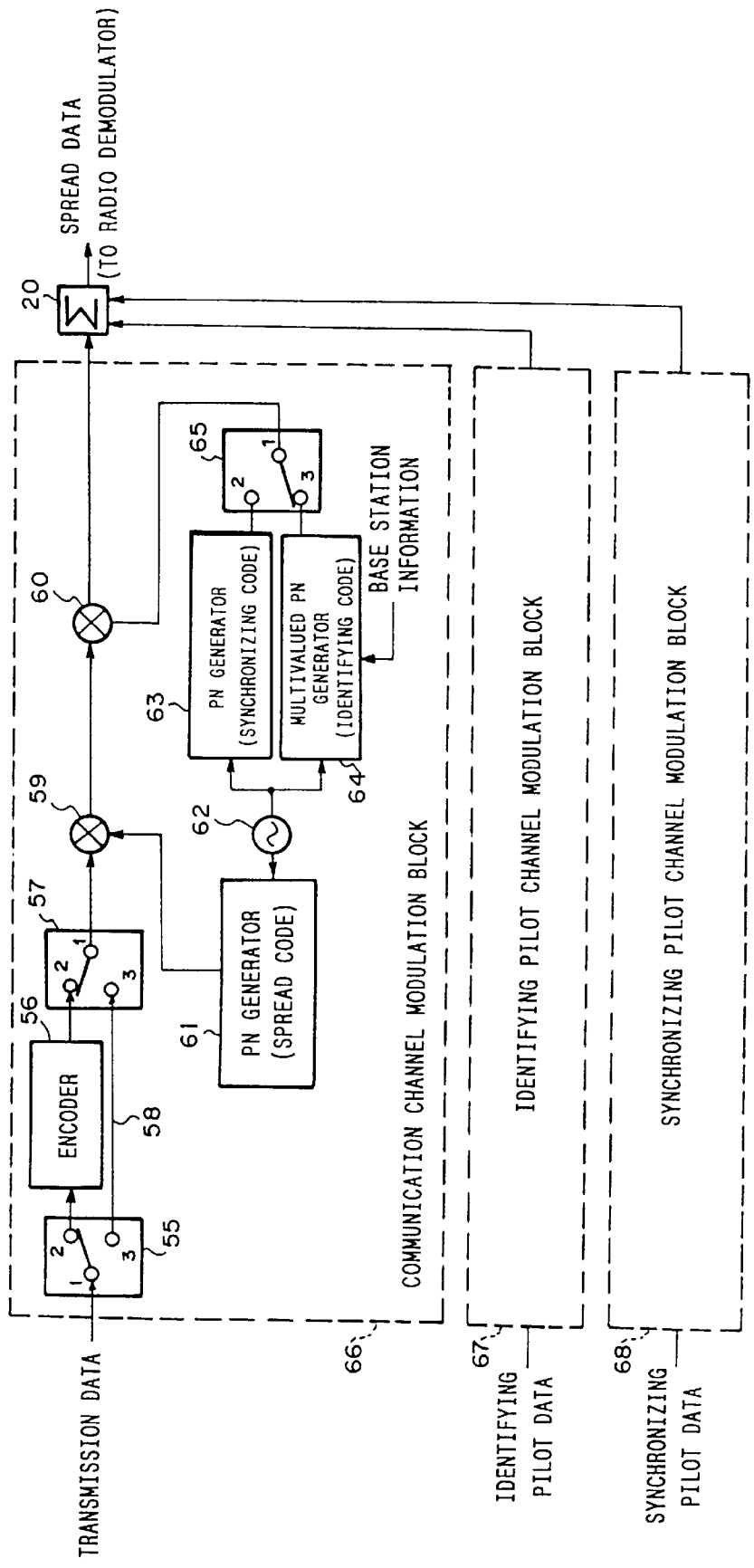
FIG. 11 is a diagram showing the construction of the reception unit of the base station of the spread spectrum communication system of the second embodiment of the present invention.

FIG. 11 is a diagram showing the construction of the transmission unit of a spread spectrum communication system according to a third embodiment of the present invention. The difference from the first embodiment of FIG. 1 resides in that the modulation blocks of the communication channel, the identifying pilot channel and the synchronizing pilot channel are made common. Accordingly, the three modulation blocks have the same internal construction, and the same reference numerals are used in the following description on the internal construction of the blocks. Therefore, the respective modulation blocks can be manufactured in the same manner in the same process, and the manufacturing cost in the manufacturing process can be greatly reduced.

In FIG. 11, the common parts to FIG. 1 are represented by the same reference numerals. The transmission unit of this embodiment comprises channel modulation blocks 66, 67 and 68, and the adder 20. The channel modulation block comprises an encoder 56 for receiving transmission data or pilot data (any one of the identifying pilot data and the synchronizing pilot data) to perform encoding processing such as error correction code processing, interleave, etc. on the input data, a transmission path 58 for passing the input signal therethrough when no encoding processing is performed on the input data, a switching unit 55 for selecting one of the encoder 56 and the transmission path to which the input signal should be input, a switching unit 57 for selecting one of the output of the encoder 56 and the output of the transmission path 58, a PN generator 61 for generating a PN code having a chip rate higher than the input data, a multiplier 59 for multiplying the input data and the PN code generated in the PN generator 61, a PN generator 63 which has the same chip rate as the PN generator 61 and generates the PN code for synchronous acquisition, and a multivalued PN generator 64 which has the same chip rate as the PN generator 61 and is input with the base-station information to generate a multivalued PN code for base-station identification, a switching unit 60 for multiplying the output of the multiplier 59 and the output signal of the switching unit 65, and an oscillator 62 for supplying an operation reference signal to the PN generator 61, the PN generator 63 and the multivalued PN generator 64.

Next, the operation of the third embodiment will be described.

First, an operation of modulating the communication channel data in the communication channel modulation block 66 will be described. The switching units 55 and 57 are switched so that the switching terminals thereof are connected to a contact point 2, and the input transmission data are input to the encoder 56 and subjected to the encoding processing such as the error correction coding, the interleave, etc. The output of the encoder 56 is multiplied by the spread code (the spread code A of FIG. 1) generated in the PN generator 61 in the multiplier 59. Further, in the multivalued PN generator 64, the base-station information is input to generate an identifying code having the same chip rate as the spread code A, and the identifying code thus generated is input to the switching unit 65. The switching unit 65 is switched so that the switching terminal thereof is connected to a contact point 3 to connect the multivalued PN generator 64 and the multiplier 60. In the multiplier 60, the multiplication result of the multiplier 59 is multiplied by the PN code generated in the multivalued PN generator 64 selected by the switching unit 65, and output to the adder 20.

Next, an operation of modulating the identifying pilot channel data in the identifying pilot channel modulation block 67 will be described.

The switching units 55 and 57 are switched so that the switching terminals thereof are connected to the contact point 3, and the input identifying pilot data are input to the transmission path 58. The output of the transmission path 58 is multiplied by the spread code generated in the PN generator 61 (the spread code A of FIG. 1) by the multiplier 59. Further, in the multivalued PN generator 64, the base-station information is input to generate an identifying code having the same chip rate as the spread code A, and output to the switching unit 65. The switching unit 65 is switched so that the switching terminal thereof is connected to the contact point 3, thereby connecting the multivalued PN generator 64 and the multiplier 60 to each other. In the multiplier 60, the multiplication result of the multiplier 59 is multiplied by the PN code generated in the multivalued PN generator 64 selected by the switching unit 65, and the result is output to the adder 20.

Next, an operation of modulating the synchronizing pilot channel data in the synchronizing pilot channel modulation block 68 will be described. The switching units 55 and 57 are switched so that the switching terminals thereof are connected to the contact point 3, and the input synchronizing pilot data are input to the transmission path 58. The output of the transmission path 58 is multiplied by the spread code generated in the PN generator 61 (the spread code A of FIG. 1) in the multiplier 59. Further, in the PN generator 63, the synchronizing code having the same chip rate as the spread code A is generated, and then it is output to the switching unit 65. The switching unit 65 is switched so that the switching terminal thereof is connected to the contact point 2, thereby connecting the PN generator 63 and the multiplier 60. In the multiplier 60, the multiplication result of the multiplier 59 is multiplied by the PN code generated in the PN generator 63 selected by the switching unit 65, and then the result is output to the adder 20.

Figure 12:
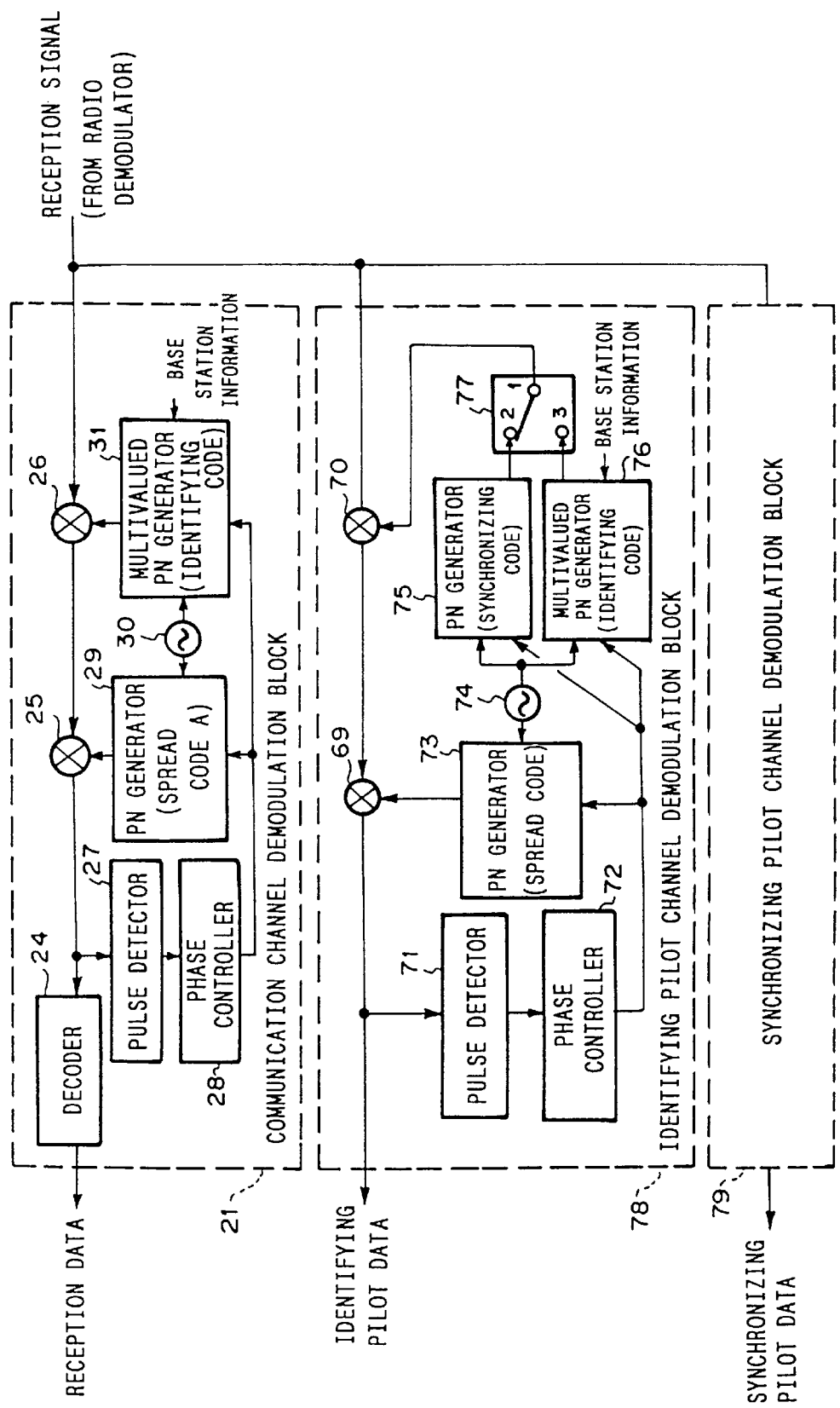
FIG. 12 is a diagram showing the construction of the transmission unit of the base station of the spread spectrum communication system of the third embodiment of the present invention.

FIG. 12 is a block diagram showing the construction of the reception unit of a spread frequency communication system according to a fourth embodiment of the present invention.

The difference from the reception unit of the first embodiment shown in FIG. 2 resides in that the demodulation blocks of the identifying pilot channel and the synchronizing pilot channel are made common. Accordingly, as in the case of the transmission unit (FIG. 10), the manufacturing cost can be greatly reduced. In FIG. 12, the common parts are represented by the same reference numerals.

The reception unit of this embodiment comprises a communication channel demodulation block 21, and pilot channel modulation blocks 78 and 79. The pilot channel demodulation block 78, 79 comprises a multivalued PN generator 76 which receives a reception signal which is frequency-converted to an IF band in another radio demodulator, and has the same construction as the multivalued PN code generator 11 of the identifying pilot channel modulation block 18 of FIG. 1, a PN generator 75 having the same construction as the PN generator 16 19 show in FIG. 1, a switching unit 77 for selecting one of the output of the PN generator 75 and the output of the multivalued PN generator 76, a multiplier 70 for multiplying the reception signal and the output of the PN generator 75 or the output of the multivalued PN generator 76 which is selected by the switching unit 77, a PN code generator 73 for generating an despread code of the reception signal, a multiplier 69 for multiplying the multiplication result of the multiplier 70 and the PN code generated in the PN code generator 73, a pulse detector 71 for detecting a peak pulse occurring in the output of the multiplier 69, a phase controller 72 for controlling the phase of the PN codes generated in the PN generator 73 and the PN generator 75 on the basis of the detection result of the pulse detector 71, and an oscillator 74 for supplying an operation reference signal to the PN generators 73, 75 and the multivalued PN generator 76.

Next, the operation when the synchronizing pilot channel is received in the pilot channel demodulation block 79 will be described.

In the PN generator 75, the same code as the synchronizing code of the transmission unit is generated in the PN generator 75, and output to the switching unit 77. The synchronizing code is common to all the base stations, so that a mobile station can generate the synchronizing without restrictions. The switching unit 77 is switched so that the switching terminal thereof is connected to the contact point 2, and the PN code generated in the PN generator 75 is input to the multiplier 70. In the multiplier 70, the reception signal which is frequency-converted to the IF band in another radio demodulator is multiplied by the PN code generated in the PN generator 75. The same code as the spread code used exclusively for the synchronizing pilot channel (the spread code C of FIG. 1) is generated in the PN generator 73, and then output to the multiplier 69. In the multiplier 69, the multiplication result of the multiplier 70 is multiplied by the PN code generated in the PN generator 73.

Here, when the spread code C contained in the reception signal and the spread code C generated in the PN generator 73 are not coincident in phase with each other, a chip array having the same spectral band as the reception signal appears in the output of the multiplier 69, and only signals which are approximately at the noise level are detected in the pulse detector 71. On the other hand, when the spread code C in the reception signal and the spread code C generated in the PN generator 73 are coincident (or nearly coincident) in phase with each other, synchronizing pilot signal data which are despreaded are restored in the output of the multiplier 69, and at this time a large peak pulse continues to occur. Accordingly, the phase controller 72 slides the phase of the PN codes generated in the PN generator 73 and the PN generator 75 every one chip (or amount less than one chip) so that the largest peak pulse is continuously detected in the pulse detector 71 to perform the synchronous acquisition with the reception signal. At the same time, the phase controller 72 controls the phase of the PN generator 73 and the PN generator 75 so that the peak pulse is detected at all times to follow the synchronization.

Next, the operation when the identifying pilot channel is received in the identifying pilot channel demodulation block 78 will be described.

The same code as the identifying code of the transmission unit is generated in the multivalued PN generator 76, and then output to the switching unit 77. Since the identifying code is predetermined, the mobile station can generate the identifying code under no restrictions. The switching unit 77 is switched so that the switching terminal thereof is connected to the contact point 3, and the PN code generated in the multivalued PN generator 76 is input to the multiplier 70. In the multiplier 70, the reception signal which is frequency-converted to the IF band in another radio demodulator is multiplied by the PN code generated in the multivalued PN generator 76. The same code as the spread code used exclusively for the identifying pilot channel (the spread code B of FIG. 1) is generated in the PN generator 73, and then output to the multiplier 69. In the multiplier 69, the multiplication result of the multiplier 70 is multiplied by the PN code generated in the PN generator 73. Here, when the spread code B contained in the reception signal and the spread code B generated in the PN generator 73 are not synchronized in phase with each other, a chip array having the same spectral band as the reception signal appears in the output of the multiplier 69, and only signals which are approximately at the noise level are detected in the pulse detector 71.

On the other hand, when the spread code B in the reception signal and the spread code B generated in the PN generator 73 are coincident in phase (or nearly coincident), the identifying pilot signal data which are despreaded are restored in the output of the multiplier 69, and at this time the largest peak pulse continues to occur. Accordingly, the phase controller 72 slides the phase of the PN codes generated in the PN generator 73 and the multivalued PN generator 76 so that the largest peak pulse is continuously detected in the pulse detector 71, thereby performing the synchronous acquisition with the reception signal, and at the same time it controls the phase of the PN generator 73 and the multivalued PN generator 76 so that the peak pulse is detected at all times, thereby following the synchronization. However, at this time, since the mobile station knows that the synchronization with the synchronizing pilot channel has been established and the head of the identifying code is coincident with any head of the synchronizing code, the synchronization with the identifying code can be established, not by the sliding operation every chip, but by the sliding operation every period of the synchronizing code in the phase controller 72 while synchronizing the to the synchronizing pilot channel.

The foregoing description is applied to the case where the identification of the base station is performed by varying the absolute phase of the same PN sequence as the identifying code. However, the same is applied to the case where an absolutely different PN sequence is allocated to each base station as an identifying code. That is, the sliding operation is performed every period of the synchronizing code in the phase controller 72, and then the correlation between the reception signal and each of all kinds of identifying codes is performed to check the establishment of the synchronization.

According to this embodiment, the circuit construction can be made common, and the redundancy to failure and other troubles can be provided.

Figure 13:
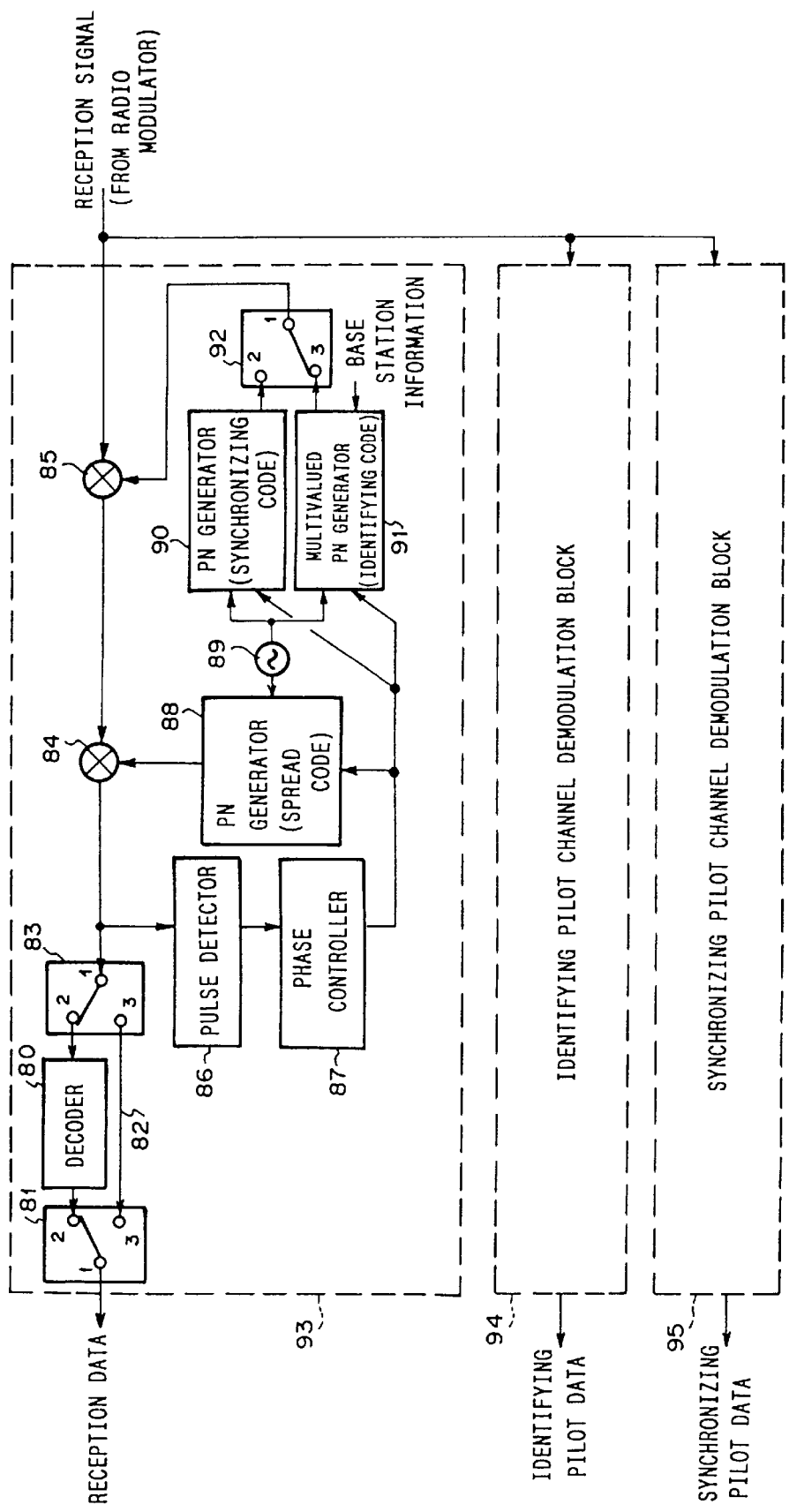
FIG. 13 is a diagram showing the construction of the reception unit of the base station of the spread spectrum communication system of the third embodiment of the present invention.
Figure 14:
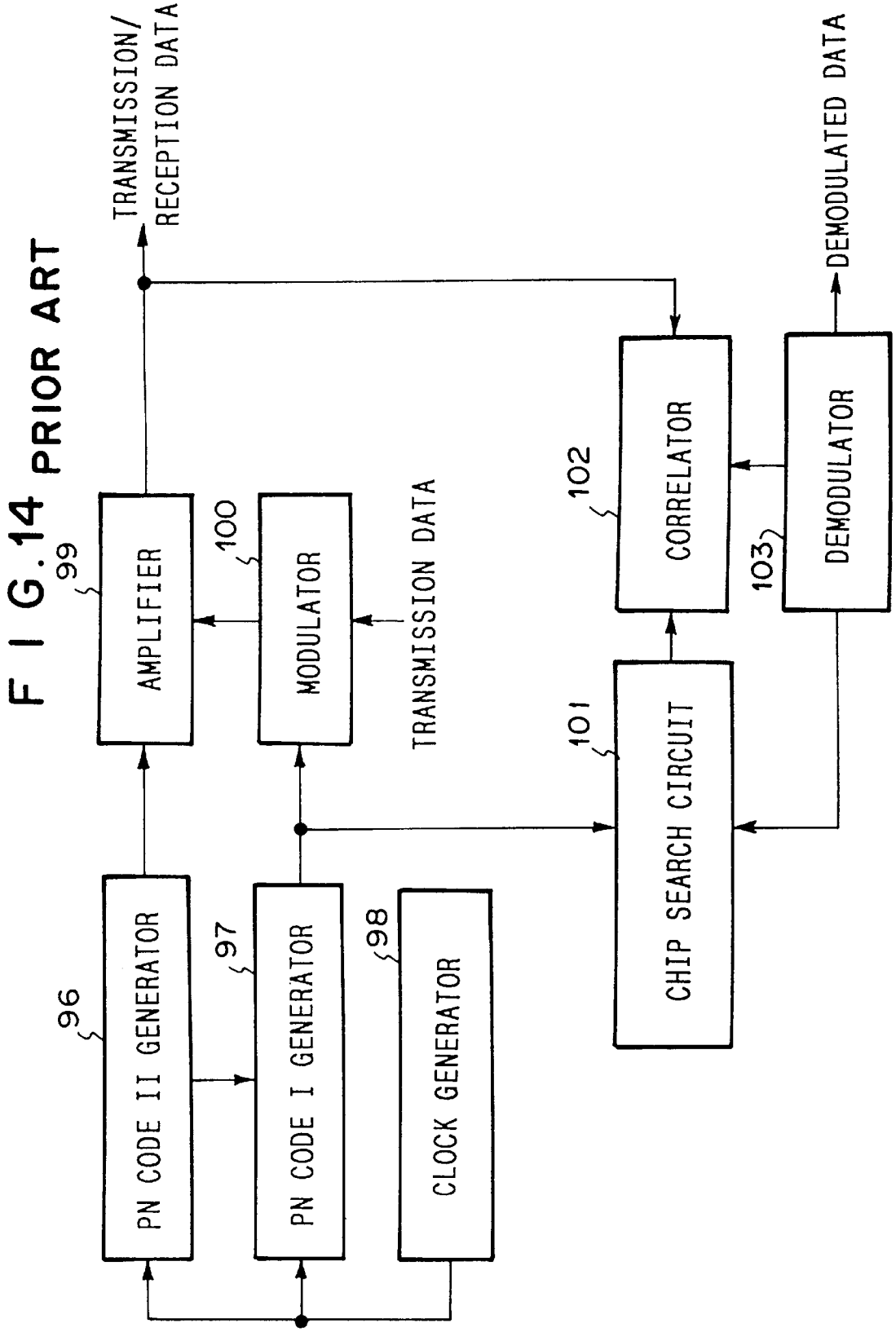
FIG. 14 is a diagram showing an example of the reception unit of a master station of a first conventional spread spectrum communication system.
Figure 15:
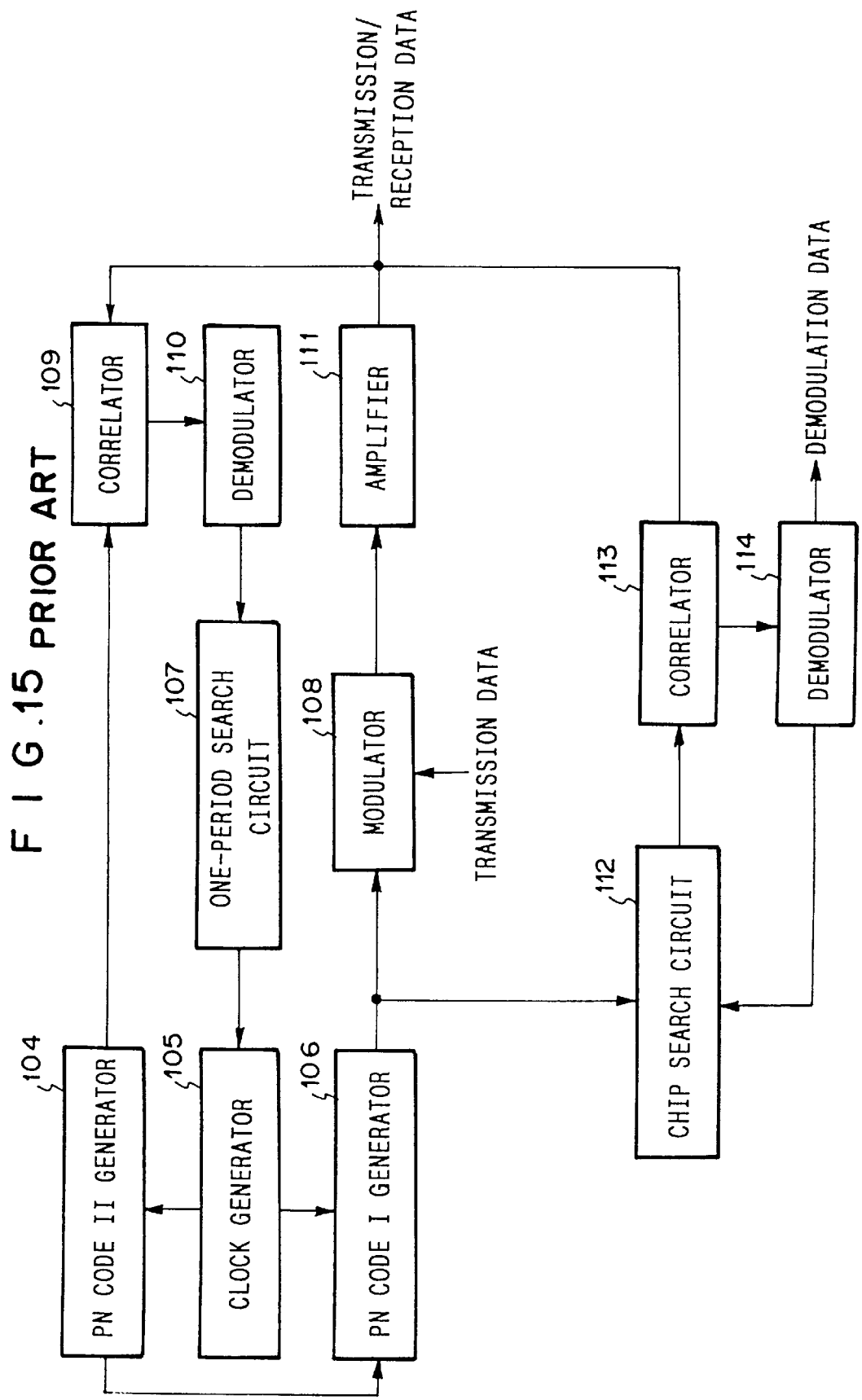
FIG. 15 is a diagram showing an example of the transmission and reception unit of a personal station to the master station of FIG. 14 in the first conventional spread spectrum communication system.
Figure 16:
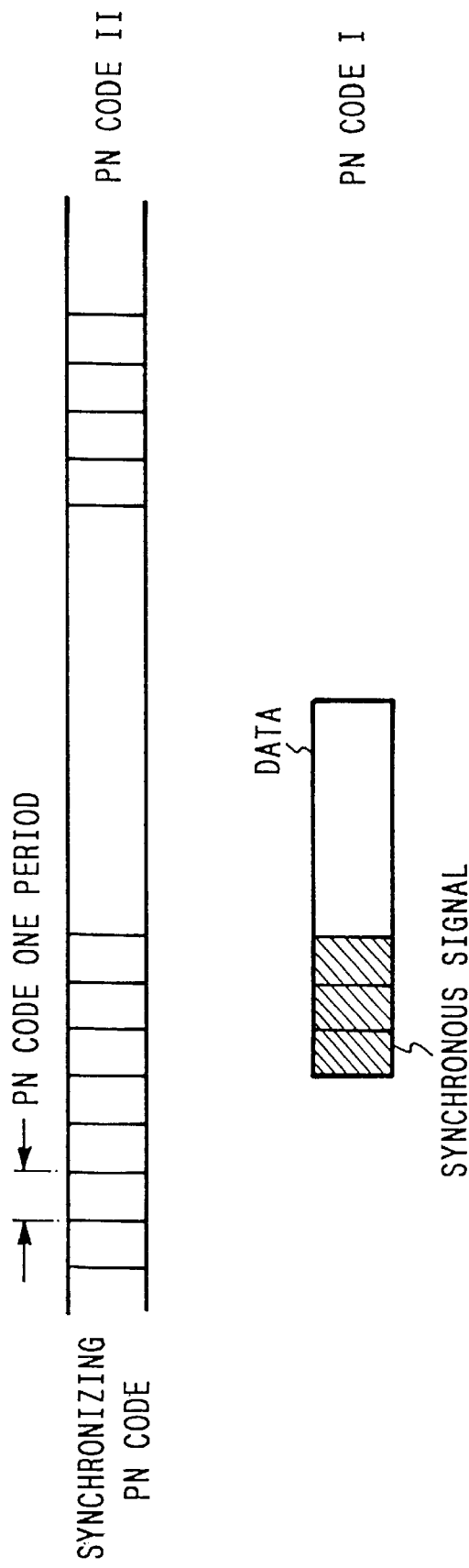
FIG. 16 is a diagram showing a synchronizing PN code and data which are transmitted from the transmission and reception unit of the master station of the prior art of FIG. 14.
Figure 17:
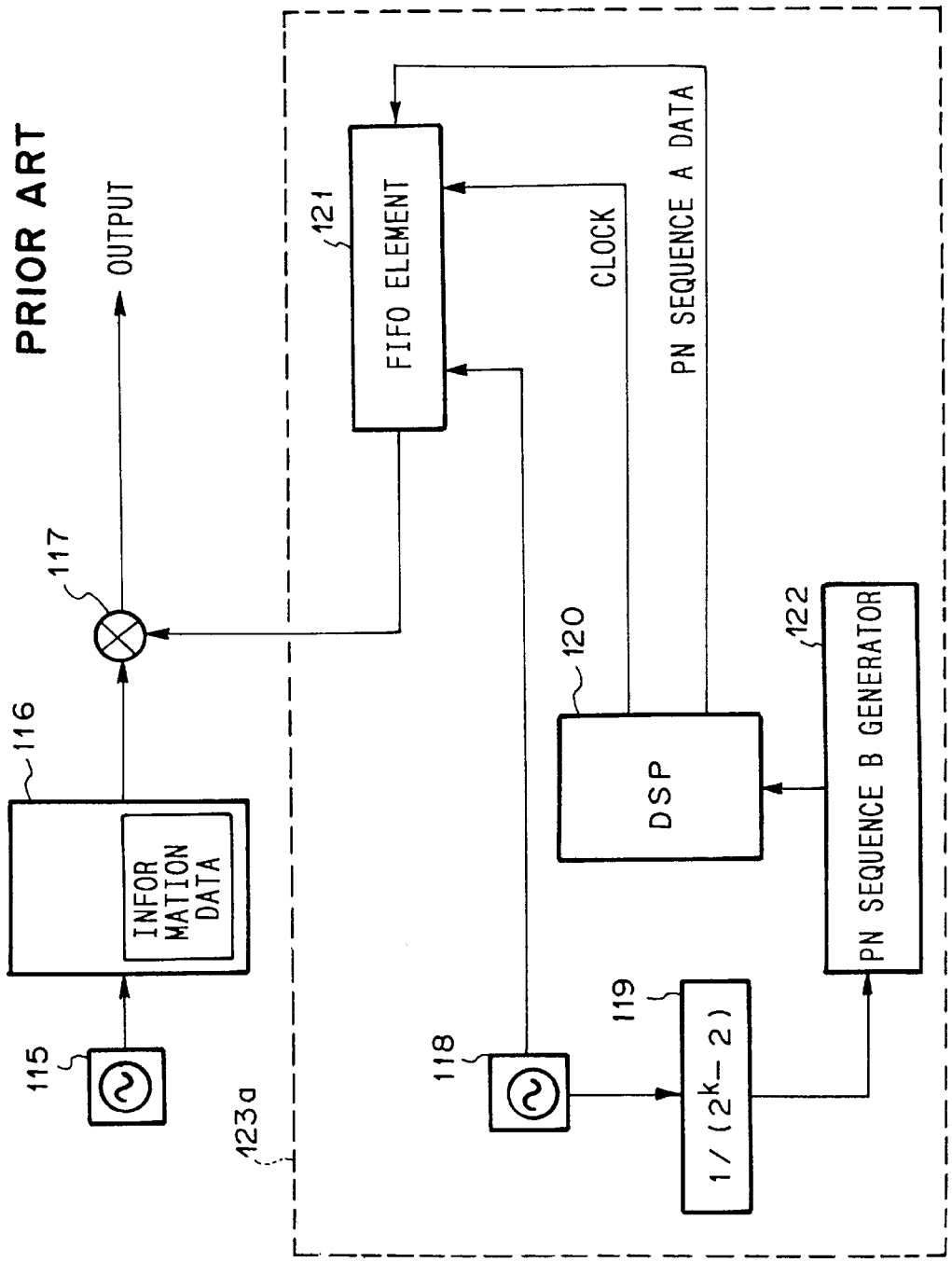
FIG. 17 is a diagram showing an example of a transmission unit of a second conventional spread spectrum communication system.
Figure 18:
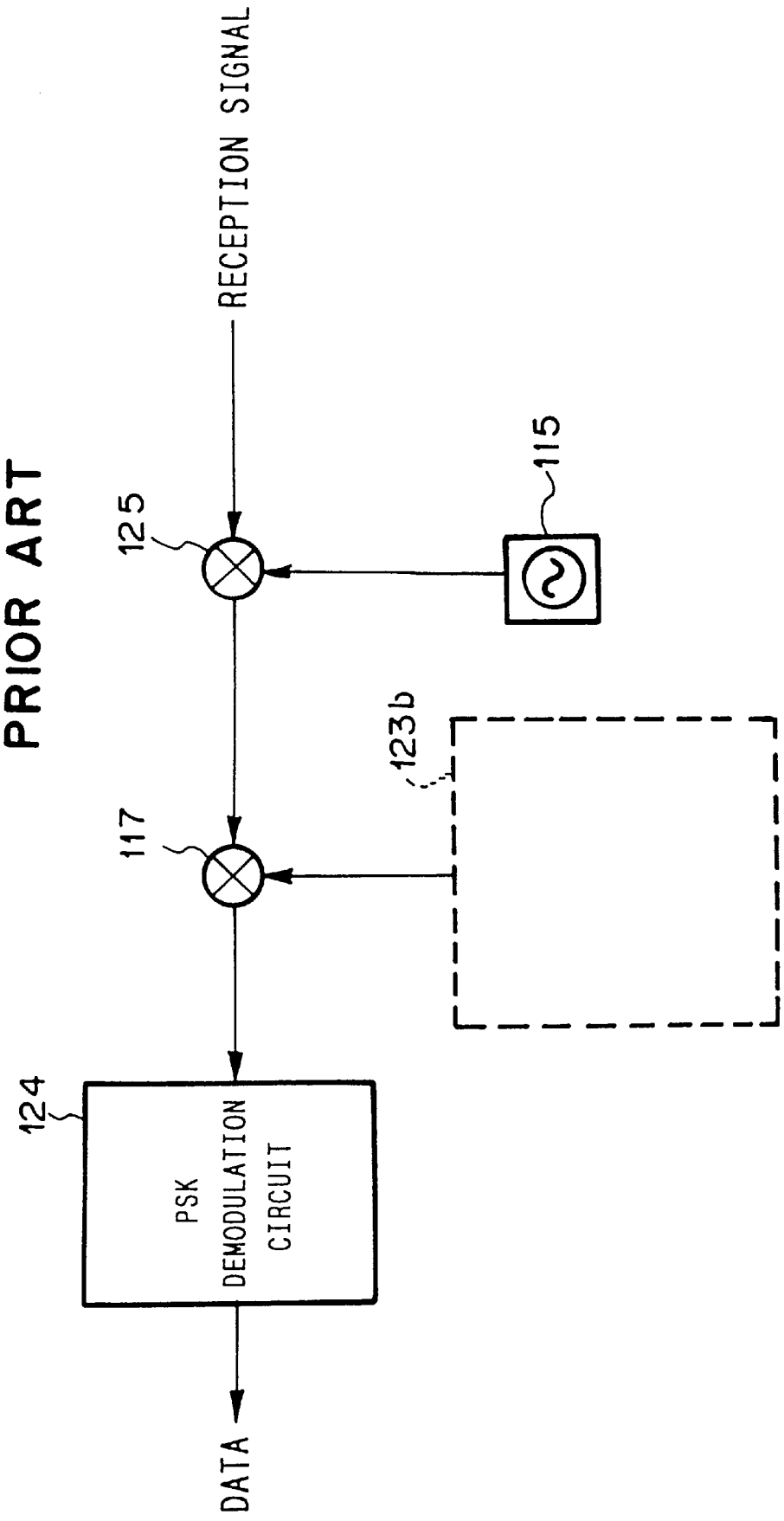
FIG. 18 is a diagram showing an example of the reception unit to the transmission unit of FIG. 17 in the second conventional spread spectrum communication system.
Figure 19:
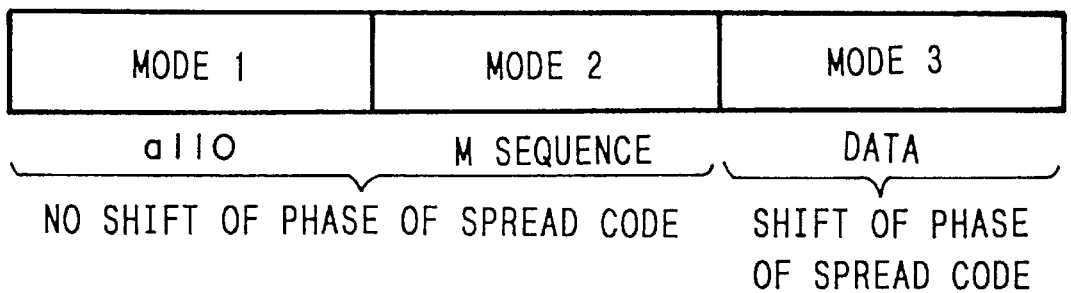
FIG. 19 is a diagram showing a communication mode of the second conventional spread spectrum communication system.
Figure 20A:
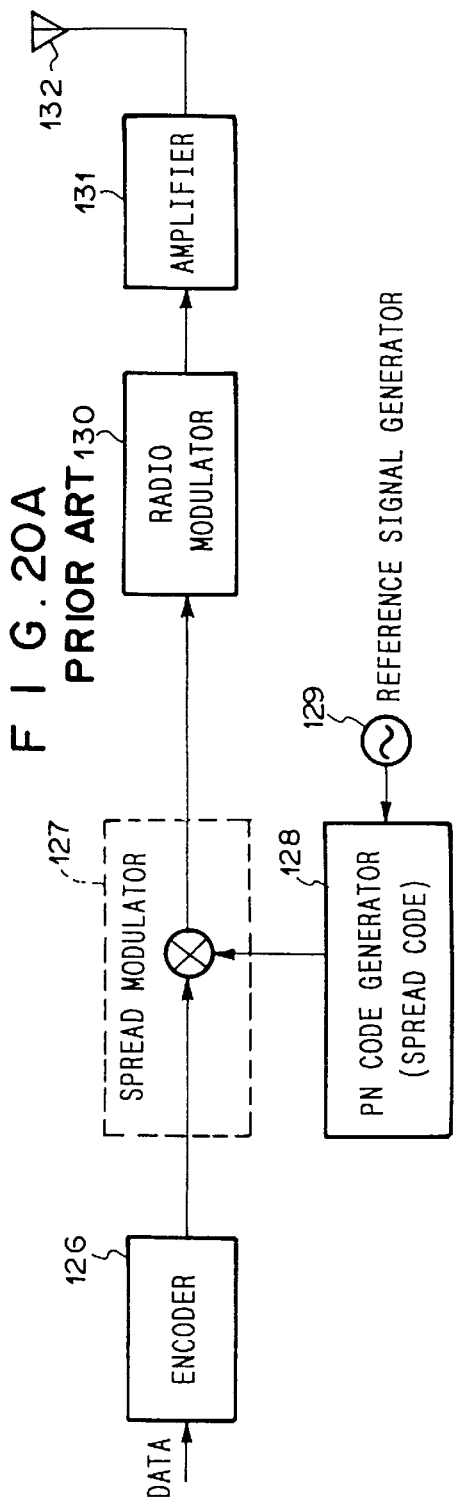
FIGS. 20A and 20B are a diagram showing the construction of general transmission unit and reception unit of CDMA system.
Figure 20B:
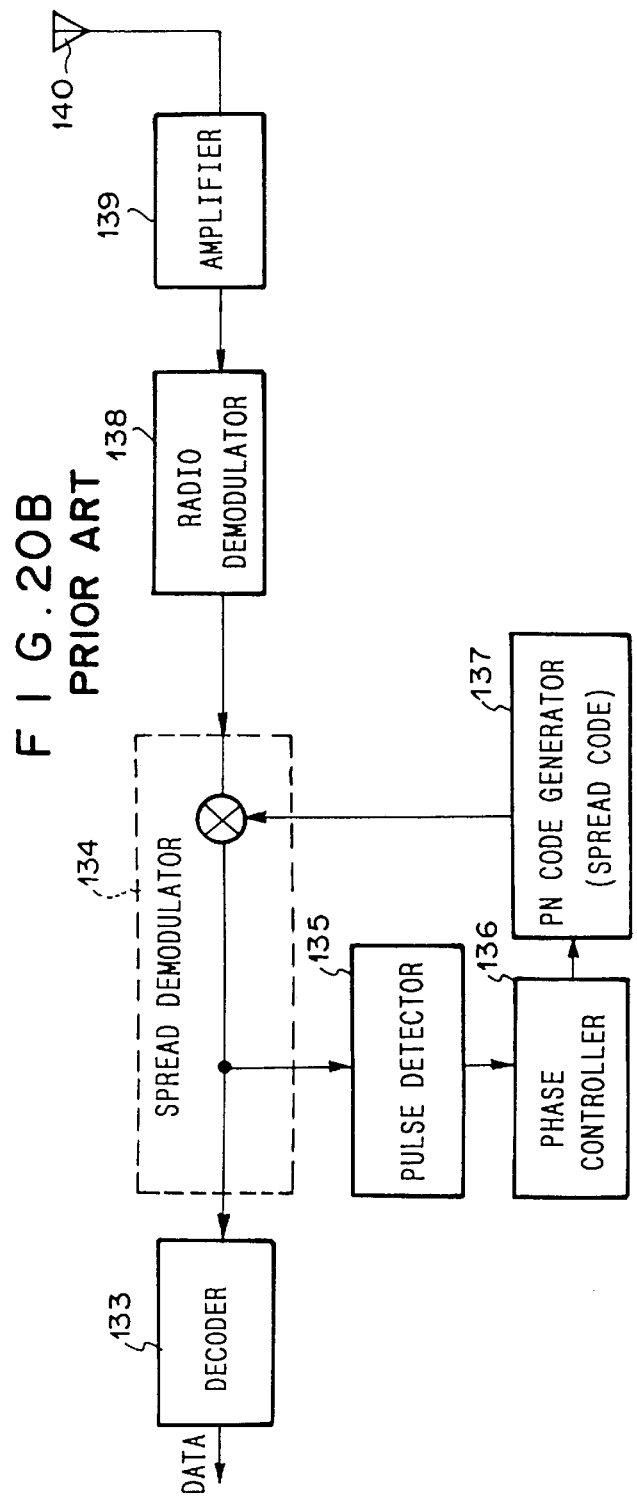

FIG. 13 is a diagram showing the construction of the reception unit of a spread spectrum communication system according to a fifth embodiment of the present invention. The difference from the reception unit of the first embodiment shown in FIG. 2 resides in that the demodulation blocks of the communication channel, the identifying pilot channel and the synchronizing pilot channel are made common. Accordingly, as in the case of the transmission unit shown in FIG. 11, the manufacturing cost can be greatly reduced.

The reception unit of this embodiment comprises data demodulation blocks 93, 94 and 95. The data demodulation block 93, 94, 95 comprises a PN generator 90 for generating a synchronizing code, a multivalued PN generator 91 for generating an identifying code, a switching unit 92 for selecting one of the output of the PN generator 90 and the output of the multivalued PN generator 91, a multiplier 85 for multiplying the reception signal and the output of the PN generator 90 or the multivalued PN generator 91 which is selected by the switching unit 92, a PN generator 88 for generating a spread code, a multiplier 84 for multiplying the multiplication result of the multiplier 85 and the PN code generated in the PN generator 88, a pulse detector 86 for detecting a peak pulse in the output of the multiplier 84, a phase controller 87 for controlling the phase of the PN codes generated in the PN generator 88, the PN generator 90 and the multivalued PN generator 91 on the basis of the detection result of the pulse detector 86, an oscillator 89 for supplying an operation reference signal to the PN generator 88, the PN generator 90 and the multivalued PN generator 91, a decoder 80 used to decode the communication channel, a transmission path 82 used to decode the identifying pilot channel or the synchronizing pilot channel, and switching units 81 and 83 for selecting one of the decoder 80 and the transmission path 82.

Next, the operation when the synchronizing pilot channel is received in the synchronizing pilot channel demodulation block 95 will be described.

The same code as the synchronizing code of the transmission unit is generated in the PN generator 90, and then output to the switching unit 92. Since the synchronizing code is common to all the base stations, the mobile station can generate this code under no restrictions. The switching unit 92 is switched so that the switching terminal thereof is connected to the contact point 2, and the PN code generated in the PN generator 90 is input to the multiplier 85. In the multiplier 85, the reception signal which is frequency-converted to the IF band in another radio demodulator is multiplied by the PN code generated in the PN generator 90. The same code as the spread code used exclusively for the synchronizing pilot channel (the spread code C of FIG. 1) is generated in the PN generator 88, and then output to the multiplier 84. In the multiplier 84, the multiplication result of the multiplier 85 is multiplied by the PN code generated in the PN generator 88. Here, when the spread code C contained in the reception signal and the spread code C generated in the PN generator 88 are not synchronized in phase with each other, a chip array having the same spectrum band as the reception signal appears in the output of the multiplier 84, and only signals which are approximately at the noise level are detected in the pulse detector 86.

On the other hand, when the spread code C in the reception signal and the spread code C generated in the PN generator 88 are coincident in phase with each other (or nearly coincident), the synchronizing pilot signal data which are despreaded are restored in the output of the multiplier 84, and the largest peak pulse continues to occur. Accordingly, the phase controller 87 slides the phase of the PN codes generated in the PN generator 88 and the PN generator 90 every chip (or amount less than one chip) so that the largest peak pulse is continuously detected in the pulse detector 86, thereby performing the synchronous acquisition with the reception signal and at the same time it controls the phase of the PN generator 88 and the PN generator 90 so that the peak pulse is detected at all times, thereby remaintaining synchronization.

Next, the operation when the identifying pilot channel is received in the identifying pilot channel demodulation block 94 will be described.

The same code as the identifying code of the transmission unit is generated in the multivalued PN generator 91, and then output to the switching unit 92. Since this identifying code is predetermined, the mobile station generates this code under no restrictions. The switching unit 92 is switched so that the switching terminal thereof is connected to the contact point 3, and the PN code generated in the multivalued PN generator 91 is input to the multiplier 85.

In the multiplier 85, the reception signal which is frequency-converted to the IF band in another radio modulator is multiplied with the PN code generated in the multivalued PN generator 91. The same code as the spread code used exclusively for the identifying pilot channel (the spread code B of FIG. 1) is generated, and then output to the multiplier 84. In the multiplier 84, the multiplication result of the multiplier 85 is multiplied by the PN code generated in the PN generator 88.

Here, when the spread code B contained in the reception signal and the spread code B generated in the PN generator 88 are not synchronized in phase, a chip array having the same spectral band as the reception signal appears in the output of the multiplier 84, and only signals which are approximately at the noise level are detected in the pulse detector 86. However, when the spread code B in the reception signal and the spread code B generated in the PN generator 88 are coincident in phase (or nearly coincident), the identifying pilot signal data which are despreaded are restored in the output of the multiplier 84, and at this time a large peak pulse continues to occur. Accordingly, the phase controller 87 slides the phase of the PN codes generated in the PN generator 88 and the multivalued PN generator 91 so that the largest peak pulse is continuously detected in the pulse detector 86, thereby performing the synchronous acquisition with the reception signal, and at the same time it controls the phase of the PN generator 88 and the multivalued PN generator 91 so that the peak pulse is detected at all times, thereby maintaining synchronization.

At this time, since the mobile station knows that the synchronization with the synchronizing pilot channel has been established and the head of the identifying code is coincident with any head of the synchronizing code, the phase controller 87 does not perform the sliding operation on the one-chip basis, but performs the sliding operation every period of the synchronizing code while synchronizing to the synchronizing pilot channel, thereby establishing the synchronization with the identifying code.

The foregoing description is applied to the case where the identification of the base station is performed by varying the absolute phase of the same PN sequence as an identifying code. However, the same is applied to the case where each of absolutely different PN sequences is allocated to each base station as an identifying code. That is, the phase controller 87 performs the sliding operation every period of the synchronizing code and then correlates all the kinds of identifying codes with the reception signal, thereby checking the establishment of the synchronization.

Finally, the operation when the communication channel is received in the data demodulation block 93 will be described.

The switching terminal of the switching unit 92 is connected to the contact point 3, and the PN code generated in the multivalued PN generator 91 is output to the multiplier 85. In the multiplier 85, the reception signal which is frequency-converted to the IF band in another radio demodulator is multiplied by the PN code generated in the multivalued PN generator 91. The same PN code as used for the spectrum spreading of the data at the transmission unit (the spread code A of FIG. 1) is generated in the PN generator 88, and output to the multiplier 84. In the multiplier 84, the multiplication result of the multiplier 85 is multiplied by the PN code (the spread code A) generated in the PN generator 88. At this time, since any spread code of the communication channel is allocated every time the communication channel is generated as described above, the mobile station does not known the spread code by which the communication channel to be received the mobile station itself is spectrum-spread. However, the spread code is notified by another control channel or the like to be transmitted from the base station, so that the mobile station can generate a correct PN code (spread code A) on the basis of the notified information.

Further, since the synchronization of the identifying pilot channel has been established at the mobile station, the spread code contained in the reception signal and the spread code generated in the PN encoder 88 of the reception unit are set in phase synchronization with each other. Accordingly, for the reception of the communication channel, the phase controller 87 is also operated so that the spread code A has the same phase timing as the spread code B, whereby the synchronization of the communication channel can be readily established. As a result of the multiplication of the multiplier 84, the despreading is performed, and the demodulated reception signal is subjected to the error correction, the deinterleaving, etc. in the demodulator 80, and then the reception data are decoded.

According to this embodiment, the circuit construction can be made common, and the redundancy to failure and other troubles can be provided.

The present invention is not limited to the above-described embodiments, and various modifications may be made without departing from the subject matter of the present inventions. For example, the presents invention may be applied by using a combination of a transmission unit and a reception unit which are different in construction from those of the above-described embodiments.

As described above, the present invention has the following effects.

(1) Only a short time is needed until the mobile station establishes the initial synchronization with the base station. This is because the base station continuously transmits the synchronizing pilot channel which is exclusively used for the initial synchronous acquisition. Accordingly, the initial synchronization between the mobile station and the base station can be readily established by shortening the code length of the synchronizing PN code used in the synchronizing pilot channel.

(2) Only a short time is needed until the mobile station establishes the synchronization with the communication channel to be transmitted from the base station. This is because the base station continuously transmits as an identifying pilot channel the identifying PN code used to identify the transmitting base station of the communication channel, and the phase of the identifying PN code contained in the identifying pilot channel and the phase of the identifying PN code contained in the communication channel are transmitted at the same timing in the same base station.

(3) Although it is remarkably difficult for an authorized receiver to establish the synchronization with the communication channel and decode data, an authorized receiver can readily perform both the establishment of the synchronization and the decoding of the data. The first reason for this resides in that the synchronization between the synchronizing pilot channel and the identifying pilot channel is needed before synchronization with the communication channel is established, and the second reason for this resides in that the identifying PN code used in the identifying pilot channel is generated from the multivalued PN code whose code length is an integral multiple of the code period of the synchronizing PN code, and phase synchronization is established between the synchronizing PN code and the identifying PN code, and the third reason for this resides in that the data of the communication channel is multiplied by the identifying PN code.

Although the present invention has been shown and described with respect to best mode embodiments thereof, it should be understood by those skilled in the art that the forgoing and various other changes, omissions, and additions in the form and detail thereof may be made therein without departing from the spirit and scope of the present invention.

What is claimed is:

1. A spread spectrum communication system having a plurality of base stations for transmitting data, each base station comprising:

a synchronizing channel for receiving synchronizing pilot data and for continuously transmitting a predetermined PN code from said base station so that the predetermined PN code is exclusively used for initial synchronization acquisition with the base station and a mobile station, an identifying pilot channel for receiving identifying pilot data and for continuously transmitting a predetermined multivalued PN code so as to perform the identification of said base station and at the same time perform synchronization acquisition of a communication channel, and a communication channel for receiving transmission data and for enabling the identification of said base station transmitting said data by multiplying the multivalued PN code used in the identifying pilot channel by said data after spectrum spreading.

2. The spread spectrum communication system as set forth in claim 1, wherein said synchronizing pilot channel and said identifying pilot channel are transmitted at all times during communication for the mobile station, and said communication channel is transmitted at a necessary time for communicating with the mobile station.

3. A transmission unit of a spread spectrum communication system comprising:

a communication channel modulation block which includes an encoder for encoding data, a first PN generator for generating a PN code having a chip rate higher than the transmission data, a first multiplier for multiplying the output signal of said encoder and the PN code generated in said first PN generator, a first multivalued PN generator for receiving base station information to generate a multivalued PN code for base-station identification, a second multiplier for multiplying the multiplication result of said first multiplier and the PN code generated in said first multivalued PN generator, and a first oscillator for supplying an operation reference signal to said first PN generator and said first multivalued PN generator;

an identifying pilot channel modulation block which includes a second PN generator for receiving a code which is predetermined as a identifying pilot signal and generating a PN code having a chip rate higher than the identifying pilot signal data, a third multiplier for multiplying the identifying pilot signal data and the PN code generated in said second PN code generator, a second multivalued PN generator which has the same chip rate as said second PN generator and is input with the base station information to generate a base-station identifying multivalued PN code, a fourth multiplier for multiplying the multiplication result of said third multiplier and the PN code generated in said second multivalued PN generator, and a second oscillator for supplying an operation reference signal to said second PN generator and said second multivalued PN generator;

a synchronizing pilot channel modulation block which includes a third PN generator for receiving a code which is predetermined as a synchronizing pilot signal and generating a PN code having a chip rate higher than the synchronizing pilot signal data, a fifth multiplier for multiplying the synchronizing pilot signal data and the PN code generated in said third PN code generator, a fourth PN generator which has the same chip rate as said third PN generator and generates a PN code for synchronization acquisition, a sixth multiplier for multiplying the multiplication result of said fifth multiplier and the PN code generated in said fourth PN generator, and a third oscillator for supplying an operation reference signal to said third PN generator and said fourth PN generator, wherein the output of each of said channel modulation blocks are added by an adder and a output of the adder is transmitted.

4. The transmission unit of a spread spectrum communication system as set forth in claim 3, wherein said synchronizing pilot channel and said identifying pilot channel are transmitted at all times during communication for the mobile station, and said communication channel is transmitted at a necessary time for communicating with the mobile station.

5. The transmission unit of a spread spectrum communication system as set forth in claim 3, wherein the operation reference signal generated by the first oscillator, the operation reference signal generated by the second oscillator and the operation reference signal generated by the third oscillator are synchronized respectively.

6. The transmission unit of a spread spectrum communication system as set forth in claim 3, wherein a synchronization is established between the first PN generator and the first multivalued PN generator, between the second PN generator and the second multivalued PN generator and between the third PN generator and the forth PN generator respectively, wherein the head of the multivalued PN code generated in the first multivalued PN generator and the second multivalued PN generator is coincident with the head of the synchronizing pilot signal generated in the forth PN generator at a fixed period.

7. The transmission unit of a spread spectrum communication system as set forth in claim 3, wherein the period of the first multivalued PN code is an integral multiple of the period of the synchronizing pilot signal, and the head of the first multivalued PN code is coincident with the head of the synchronizing pilot signal.

8. The transmission unit of a spread spectrum communication system as set forth in claim 3, wherein the period of the PN code generated in the first, second and third PN generators is an integral multiple of the period of the first and second multivalued PN code.

9. A reception unit of a spread spectrum communication system comprising:

a communication channel demodulation block which includes a third multivalued PN generator for a communication channel which receives a reception signal frequency-converted to an IF band in another radio demodulator, a seventh multiplier for multiplying the reception signal and the PN code generated in said third multivalued PN generator, a fifth PN generator for a communication channel, an eighth multiplier for multiplying the multiplication result of the seventh multiplier and the PN code generated in the fifth PN generator, a first pulse detector for detecting a peak pulse occurring in the output of the eighth multiplier, a first phase controller for controlling the phase of the PN codes generated in said fifth PN generator and said third multivalued PN generator on the basis of the detection result of said first pulse detector, a decoder for decoding the multiplication result of said eighth multiplier, and a fourth oscillator for supplying an operation reference signal to said fifth PN generator and said third multivalued PN generator;

an identifying pilot channel demodulation block which comprises a fourth multivalued PN generator for an identifying pilot channel which receives a reception signal which is frequency-converted to an IF band in another radio decoder, a ninth multiplier for multiplying the reception signal and the PN code generated in said fourth multivalued PN generator, a sixth PN code generator for an identifying pilot channel, a tenth multiplier for multiplying the multiplication result of said ninth multiplier and the PN code generated in said sixth PN code generator, a second pulse detector for detecting a peak pulse occurring in the output of said tenth multiplier, a second phase controller for controlling the phase of the PN codes generated in said sixth PN generator and said fourth multivalued PN generator on the basis of the detection result of said second pulse detector, and a fifth oscillator for supplying an operation reference signal to said sixth PN generator and said fourth multivalued PN generator; and a synchronizing pilot channel demodulation block which includes a seventh PN code generator for a synchronizing pilot channel which receives a reception signal which is frequency-converted to an IF band in another radio demodulator, an eleventh multiplier for multiplying the reception signal and the PN code generated in said seventh PN generator, an eighth PN generator for a synchronizing pilot channel, a twelfth multiplier for multiplying said eleventh multiplier and the PN code generated in said eighth PN generator, a third pulse detector for detecting a peak pulse occurring in the output of said twelfth multiplier, a third phase controller for controlling the PN codes generated in said seventh PN generator and said eighth PN generator on the basis of the detection result of said third pulse detector, and a sixth oscillator for supplying an operation reference signal to said seventh PN generator and said eighth PN generator.

10. The reception unit of a spread spectrum communication system as set forth in claim 9, wherein the operation reference signal generated by the forth oscillator, the operation reference signal generated by the fifth oscillator and the operation reference signal generated by the sixth oscillator are synchronized respectively.

11. A transmission unit of a spread spectrum communication system comprising:

a communication channel modulation block which includes an encoder for receiving transmission data and encoding the data, a first PN generator for generating a PN code having a chip rate higher than the transmission data, a first multiplier for multiplying the output signal of said encoder and the PN code generated in said first PN generator, a first multivalued PN generator which has the same chip rate at said first PN generator and receives base station information to generate a base-station identifying multivalued PN code, a second multiplier for multiplying the multiplication result of said first multiplier and the PN code generated in said multivalued PN generator, and a first oscillator for supplying an operation reference signal to said first PN generator and said first multivalued PN generator;

an identifying pilot channel modulation block which includes a second PN generator for receiving identifying pilot data and generating a PN code having a chip rate higher than the input data, a third multiplier for multiplying the input data and the PN code generated in said second PN generator, a third PN generator which has the same chip rate as said second PN generator and generates a PN code for synchronous acquisition, a second multivalued PN generator which has the same chip rate as said second PN generator and receives base station information to generate a multivalued PN code for base-station identification, a first switching unit for selecting the output of said second multivalued PN generator from the output of said third PN generator and the output of said second multivalued PN generator, a fourth multiplier for multiplying the output of said third multiplier and the output signal of said first switching unit, and a second oscillator for supplying an operation reference signal to said second PN generator, said third PN generator and said second multivalued PN generator;

a synchronizing pilot channel modulation block which has the same construction as said identifying pilot channel modulation block and in which said first switching unit selects said third PN generator; and an adder for adding the output of each of said channel modulation blocks.

12. The transmission unit of a spread spectrum communication system as set forth in claim 11, wherein said synchronizing pilot channel and said identifying pilot channel are transmitted at all times during communication for the mobile station, and said communication channel is transmitted at a necessary time for communicating with the mobile station.

13. The transmission unit of a spread spectrum communication system as set forth in claim 11, wherein the operation reference signal generated by the first oscillator and the operation reference signal generated by the second oscillator are synchronized respectively.

14. The transmission unit of a spread spectrum communication system as set forth in claim 11, wherein a synchronization is established between the first PN generator and the first multivalued PN generator, between the second PN generator and the second multivalued PN generator and between the third PN generator and the forth PN generator respectively, wherein the head of the multivalued PN code generated in the first multivalued PN generator and the second multivalued PN generator is coincident with the head of the synchronizing pilot signal generated in the forth PN generator at a fixed period.

15. The transmission unit of a spread spectrum communication system as set forth in claim 11, wherein the period of the first multivalued PN code is an integral multiple of the period of the synchronizing pilot signal, and the head of the first multivalued PN code is coincident with the head of the synchronizing pilot signal.

16. The transmission unit of a spread spectrum communication system as set forth in claim 11, wherein the period of the PN code generated in the first, second and third PN generators is an integral multiple of the period of the first and second multivalued PN code.

17. A transmission unit of a spread spectrum communication system comprising:

a communication channel modulation block which includes an encoder for receiving input data to encode the input data, a transmission path through which the input data pass when the input data are not subjected to the encoding processing, a first switching unit for inputting the input data to said encoder in one position thereof and said transmission path in another position thereof, a second switching unit for selecting the output of said encoder in one position thereof and said transmission path in another position thereof, a first PN generator for generating a PN code having a chip rate higher than the input data, a first multiplier for multiplying the input data passing through said second switching unit and the PN code generated in said first PN generator, a second PN generator which has the same chip rate as said first PN generator and generates a PN code for synchronous acquisition, a multivalued PN generator which has the same chip rate as said first PN generator and receives base station information to generate a multivalued PN code for base station identification, a third switching unit for selecting the output of said second PN generator or the output of said multivalued PN generator, a second multiplier for multiplying the output of said first multiplier and the output signal of said third switching unit, and an oscillator for supplying an operation reference signal to said first PN generator, said second PN generator and said multivalued PN generator;

an identifying pilot channel modulation block which has the same construction as said communication channel modulation block and receives identifying pilot data and in which both said first and second switching units selects the transmission path, and said third switching unit selects the multivalued PN generator;

a synchronizing pilot channel modulation block which has the same construction as said communication channel modulation block and receives synchronizing pilot data and in which both said first and second switching units select said transmission path, and said third switching unit selects said second PN generator; and an adder for adding the output of each of said channel modulation blocks.

18. The transmission unit of a spread spectrum communication system as set forth in claim 17, wherein said synchronizing pilot channel and said identifying pilot channel are transmitted at all times during communication for the mobile station, and said communication channel is transmitted at a necessary time for communicating with the mobile station.

19. A reception unit of a spread spectrum communication system comprising:

a communication channel demodulation block which includes a first multivalued PN generator for a communication channel which receives a reception signal frequency-converted to an IF band, a first multiplier for multiplying the reception signal and the PN code generated in said first multivalued PN generator, a first PN generator for a communication channel, a second multiplier for multiplying the multiplication result of said first multiplier and the PN code generated in said first PN generator, a first pulse detector for detecting a peak pulse occurring in the output of said second multiplier, a first phase controller for controlling the phase of the PN codes generated in said first PN generator and said multivalued PN generator on the basis of the detection result of said first pulse detector, a decoder for performing decoding processing on the multiplication result of said second multiplier, and a first oscillator for supplying an operation reference signal to said first PN generator and said first multivalued PN generator;

an identifying pilot channel demodulation block which includes a second multivalued PN generator for an identifying a pilot channel which receives a reception signal frequency-converted to an IF band, a second PN generator for a synchronizing pilot channel, a switching unit for selecting the output of said second multivalued PN generator from among the outputs of said second PN generator and the output of said second multivalued PN generator, a third multiplier for multiplying the output of said second multivalued PN generator selected by said switching unit and the reception signal, a third PN code generator for generating a despread code of the reception signal, a fourth multiplier for multiplying the multiplication result of said third multiplier and the PN code generated in said third PN code generator, a second pulse detector for detecting a peak pulse occurring in the output of said fourth multiplier, a second phase controller for controlling the phase of the PN codes generated in said second PN generator, said third PN generator and said second multivalued PN generator on the basis of the detection result of said second pulse detector, and a second oscillator for supplying an operation reference signal to said second PN generator, said second multivalued PN generator and said third PN generator; and a synchronizing pilot channel decoding block which has the same construction as said identifying pilot channel decoding block and in which said switching unit selects the output of second PN generator.

20. The reception unit of a spread spectrum communication system as set forth in claim 19, wherein the operation reference signal generated by the first oscillator and the operation reference signal generated by the second oscillator are synchronized respectively.

21. A reception unit of a spread spectrum communication system comprising:

a communication pilot channel demodulation block which includes a first PN generator for generating a synchronizing code, a first multivalued PN generator for generating an identifying code, a first switching unit for selecting the output of said first PN generator from among the outputs of said first PN generator and said first multivalued PN generator, a first multiplier for multiplying the output of said first PN generator selected by said first switching unit and the reception signal, a second PN generator for generating a spread code, an second multiplier for multiplying the multiplication result of said first multiplier and the PN code generated in said second PN generator, a pulse detector for detecting a peak pulse occurring in the output of said second multiplier, a phase controller for controlling the phase of the PN codes generated in said second PN generator, said first PN generator and said first multivalued PN generator on the basis of the detection result of said pulse detector;

a first oscillator for supplying an operation reference signal to said second PN generator, said first PN generator and said first multivalued PN generator, a decoder for demodulating the communication channel, a transmission path which is used when the identifying pilot channel or the synchronizing pilot channel is demodulated without said decode, and second and third switching units for selecting said decoder from among said decoder and said transmission path;

an identifying pilot channel demodulation block which has the same construction as said communication pilot channel demodulation block and in which said first switching unit selects the output of said first multivalued PN generator and said second and third switching units select said transmission path; and a synchronizing pilot channel demodulation block which has the same construction as said communication pilot channel demodulation block and in which said first switching unit selects the output of said first PN generator and said second and third switching units selects said transmission path.

* * * * *